(12) United States Patent
Yoshioka et al.

(10) Patent No.: US 12,133,213 B2
(45) Date of Patent: Oct. 29, 2024

(54) TERMINAL AND RADIO COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 313 days.

(21) Appl. No.: 17/596,960

(22) PCT Filed: Jun. 27, 2019

(86) PCT No.: PCT/JP2019/025712
§ 371 (c)(1),
(2) Date: Dec. 22, 2021

(87) PCT Pub. No.: WO2020/261510
PCT Pub. Date: Dec. 30, 2020

(65) Prior Publication Data
US 2022/0248424 A1 Aug. 4, 2022

(51) Int. Cl.
*H04W 72/12* (2023.01)
*H04W 72/0446* (2023.01)
*H04W 72/1263* (2023.01)
*H04W 72/23* (2023.01)

(52) U.S. Cl.
CPC ... *H04W 72/1263* (2013.01); *H04W 72/0446* (2013.01); *H04W 72/23* (2023.01)

(58) Field of Classification Search
CPC . H04L 27/26025; H04L 5/001; H04L 5/0023; H04L 5/0044; H04L 5/0053; H04L 5/0082; H04L 5/0092; H04W 72/0446; H04W 72/1263; H04W 72/23

USPC .......................................................... 370/329
See application file for complete search history.

(56) References Cited

U.S. PATENT DOCUMENTS

| | | | |
|---|---|---|---|
| 11,705,995 B2* | 7/2023 | Wang | H04L 1/1819 370/329 |
| 11,882,036 B2* | 1/2024 | Lee | H04L 45/74 |
| 2019/0149365 A1* | 5/2019 | Chatterjee | H04L 25/0226 370/329 |
| 2022/0110128 A1* | 4/2022 | Takahashi | H04L 5/0044 |

(Continued)

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).

(Continued)

*Primary Examiner* — Robert J Lopata
(74) *Attorney, Agent, or Firm* — Osha Bergman Watanabe & Burton LLP

(57) ABSTRACT

One aspect of a terminal of the present disclosure includes: a receiving section configured to receive one or more shared channels scheduled by using a downlink control channel allocated in a plurality of slots; and a control section configured to determine allocation of the shared channel in a time direction based on allocation information regarding allocation of the shared channel in the time direction notification of which is given by the downlink control channel and on a reference point configured in a specific slot among the plurality of slots.

5 Claims, 15 Drawing Sheets

(56) References Cited

U.S. PATENT DOCUMENTS

| | | | |
|---|---|---|---|
| 2022/0132567 A1* | 4/2022 | Lee | H04W 74/0808 |
| 2022/0159652 A1* | 5/2022 | Bae | H04W 72/0446 |
| 2022/0191903 A1* | 6/2022 | Bae | H04L 1/1893 |
| 2022/0287068 A1* | 9/2022 | Lin | H04L 5/0094 |

OTHER PUBLICATIONS

3GPP TSG RAN WG1 Meeting AH 1801; R1-1800788 "Remaining issues on DL/UL resource allocation" WILUS Inc.; Vancouver, Canada; Jan. 22-26, 2018 (4 pages).
3GPP TSG-RAN WG1 Meeting #97; R1-1907456 "HARQ and scheduling enhancements for NR-U" Ericsson; Reno, NV, USA; May 13-17, 2019 (14 pages).
International Search Report issued in International Application No. PCT/JP2019/025712, mailed Dec. 24, 2019 (5 pages).
Written Opinion issued in International Application No. PCT/JP2019/025712; Dated Dec. 24, 2019 (3 pages).
Extended European Search Report issued in counterpart European Patent Application No. 19935233.7, mailed on Jan. 3, 2023 (8 pages).
Samsung; "DL/UL Resource Allocation"; 3GPP TSG RAN WG1 Meeting NR#3, R1-1716004; Nagoya, Japan; Sep. 18-21, 2017 (12 pages).
3GPP TS 38.214 V15.6.0; "3rd Generation Partnership Project; Technical Specification Group Radio Access Network; NR; Physical layer procedures for data (Release 15)"; Jun. 2019 (105 pages).

* cited by examiner

| SUBCARRIER SPACING | 15kHz | 30kHz | 60kHz | 120kHz | 240kHz | 480kHz | 960kHz |
|---|---|---|---|---|---|---|---|
| SYMBOL DURATION | 66.6 μs | 33.3 μs | 16.65 μs | 8.325 μs | 4.1625 μs | 2.0812 μs | 1.0406 μs |

FIG. 2

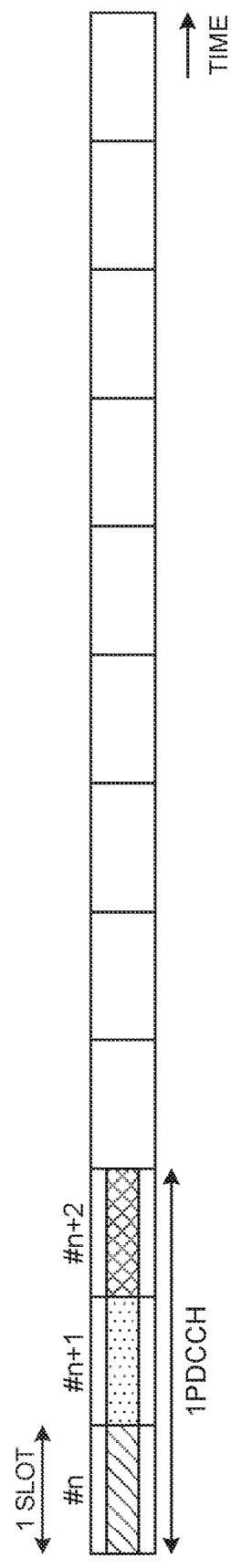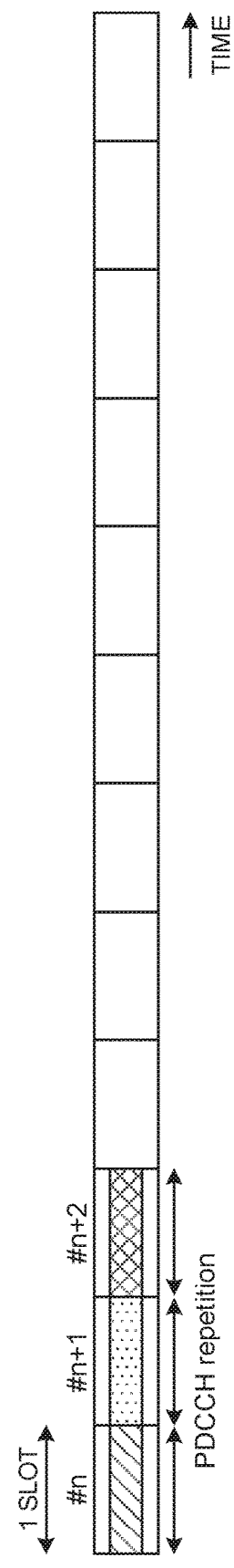

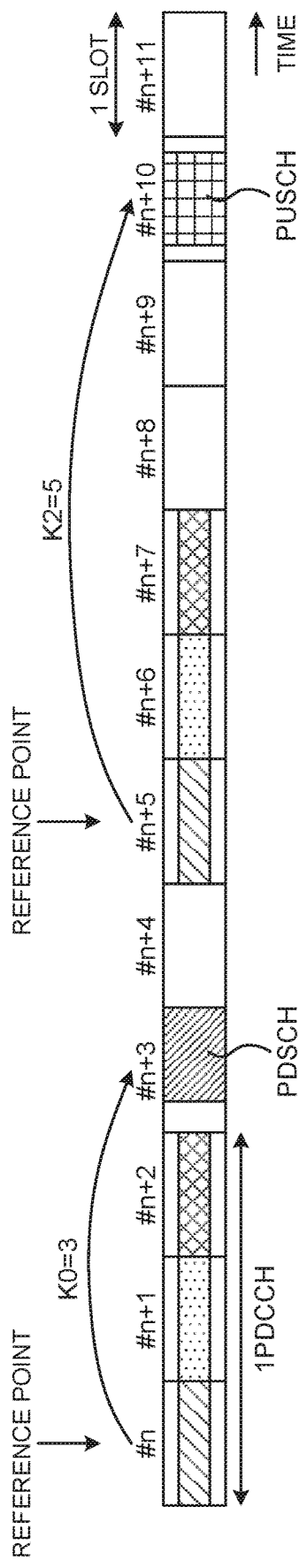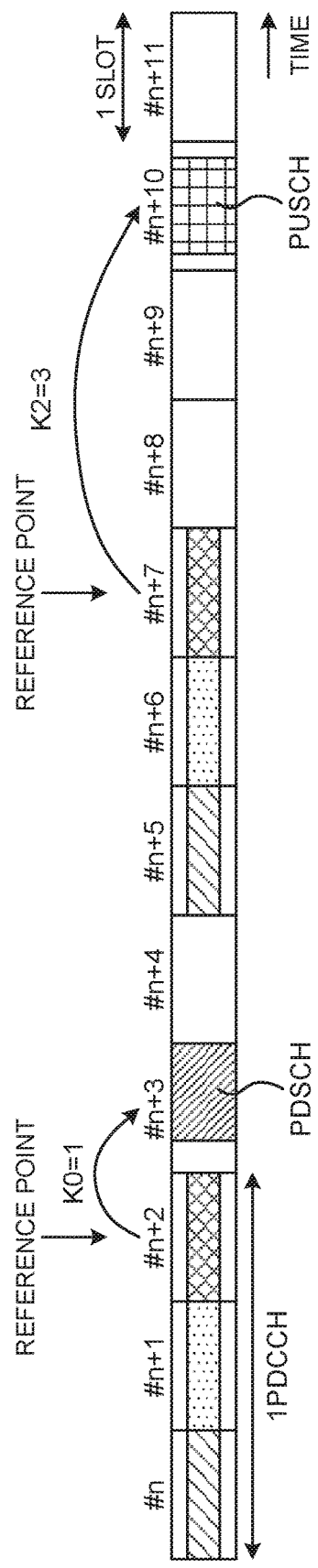
FIG. 5A
FIG. 5B

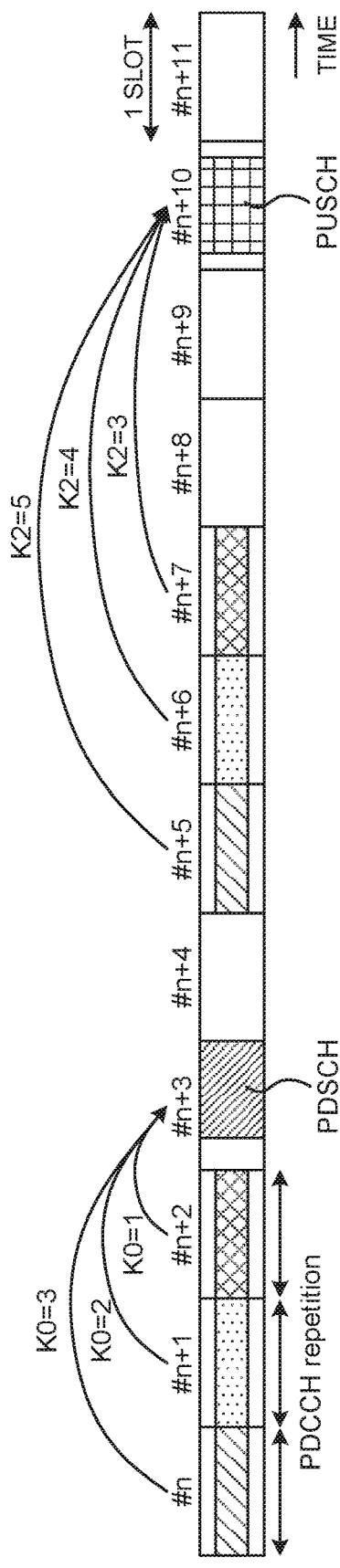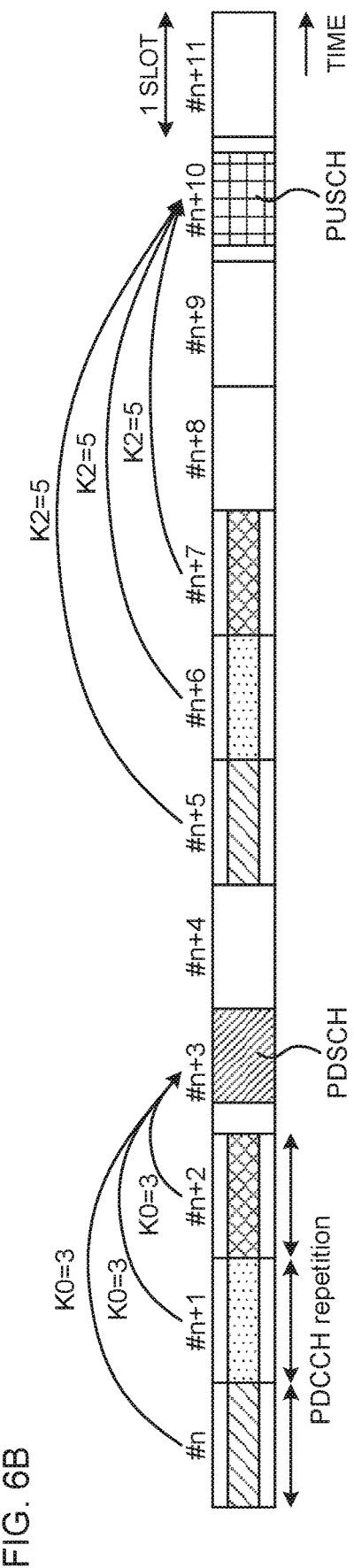
FIG. 6A
FIG. 6B

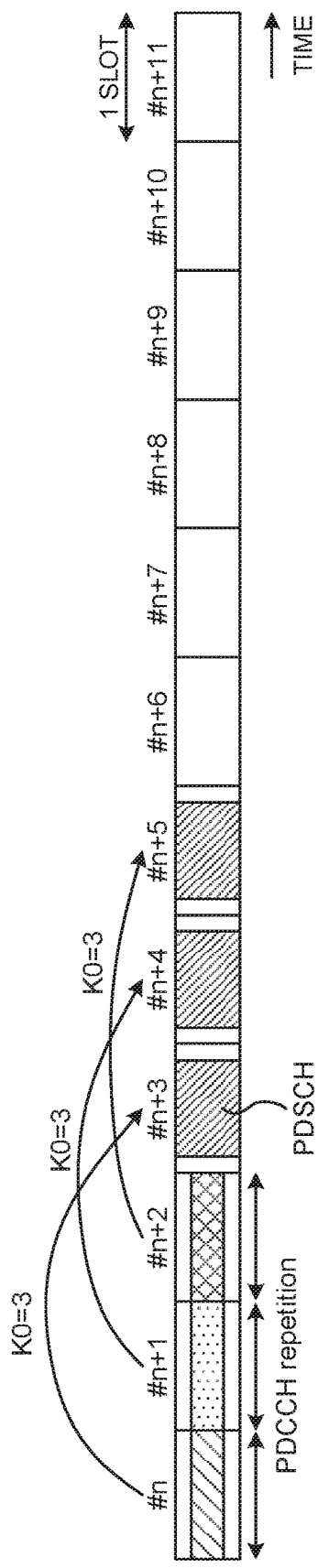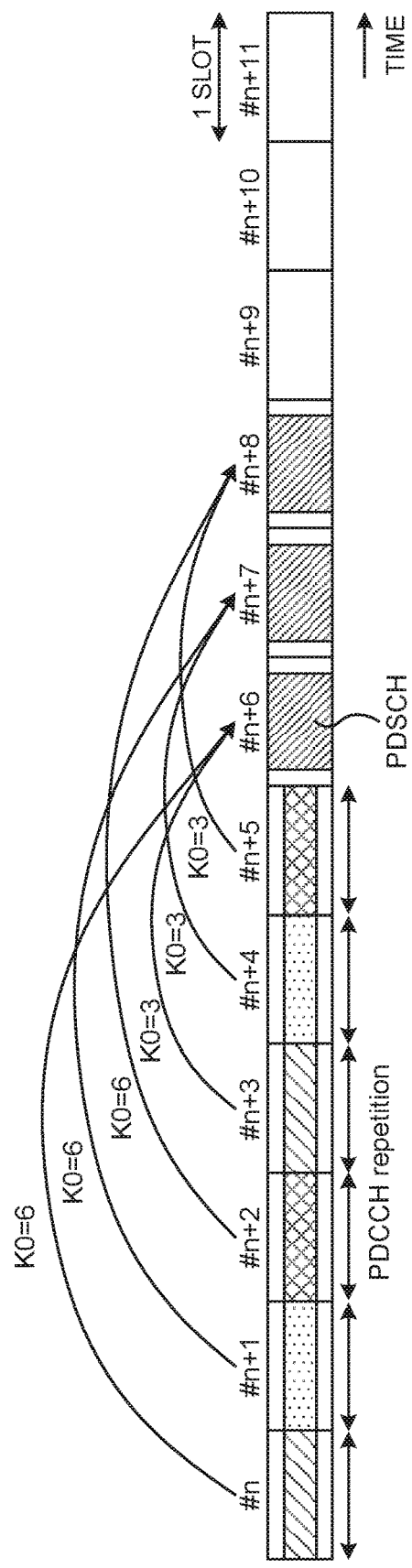

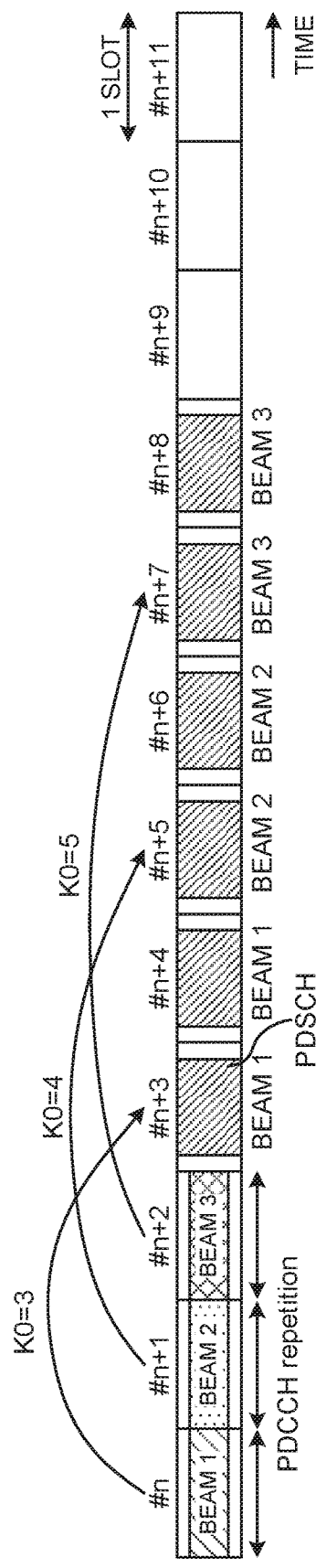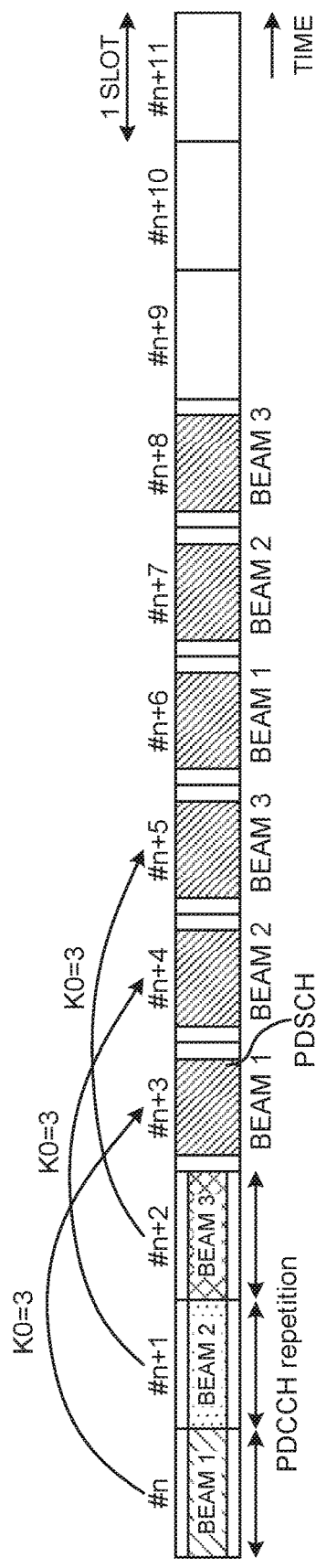

TERMINAL AND RADIO COMMUNICATION METHOD

TECHNICAL FIELD

The present disclosure relates to a terminal and a radio communication method in next-generation mobile communication systems.

BACKGROUND ART

In the universal mobile telecommunications system (UMTS) network, the specifications of long term evolution (LTE) have been drafted for the purpose of further increasing data rates, providing low delays, and so on (see Non Patent Literature 1). In addition, the specifications of LTE-Advanced (third generation partnership project (3GPP) Release (Rel.) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), New Radio (NR), or 3GPP Rel. 15 or later) are also being studied.

In the existing LTE system (for example, 3GPP Rel. 8-14), a user terminal (for example, user equipment (UE)) controls reception of a downlink shared channel (for example, a physical downlink shared channel (PDSCH)) based on downlink control information (DCI, also referred to as DL assignment or the like) from a base station. In addition, the user terminal controls transmission of an uplink shared channel (for example, a physical uplink shared channel (PUSCH)) based on the DCI (also referred to as UL grant).

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010.

SUMMARY OF INVENTION

Technical Problem

In a future radio communication system (for example, NR after Rel. 16), it is considered to use a frequency band or frequency range (FR) higher than a predetermined frequency (for example, 52.6 GHz).

In a frequency band higher than the predetermined frequency, it is assumed that a phase noise becomes large and high sensitivity is provided for a peak-to-average power ratio (PAPR). Therefore, in a frequency band higher than the predetermined frequency, it is assumed that a subcarrier spacing (SCS) is widened. When the subcarrier spacing becomes wider, it is conceivable that at least one of a symbol duration and a slot duration becomes shorter.

However, when at least one of the symbol duration and the slot duration is shortened, if transmission/reception control or the like used in the existing system (for example, Rel. 15) is applied as it is, there is a possibility that communication cannot be performed appropriately.

Therefore, an object of the present disclosure is to provide a terminal and a radio communication method capable of appropriately performing communication even when a high frequency band is used.

Solution to Problem

A terminal according to one aspect of the present disclosure includes: a receiving section configured to receive one or more shared channels scheduled by using a downlink control channel allocated in a plurality of slots; and a control section configured to determine allocation of the shared channel in a time direction based on allocation information regarding allocation of the shared channel in the time direction notification of which is given by the downlink control channel and on a reference point configured in a specific slot among the plurality of slots.

Advantageous Effects of Invention

According to one aspect of the present disclosure, communication can be appropriately performed even when a high frequency band is used.

BRIEF DESCRIPTION OF DRAWINGS

FIG. 2 is a diagram illustrating an example of a symbol duration corresponding to a subcarrier spacing.
FIGS. 3A and 3B are diagrams illustrating an example of a PDCCH (or a control resource set) transmitted using a plurality of slots.
FIGS. 5A and 5B are diagrams illustrating an example of time resource allocation of a shared channel.
FIGS. 6A and 6B are diagrams illustrating another example of time resource allocation of a shared channel.
FIGS. 8A and 8B are diagrams illustrating another example of time resource allocation of a shared channel.
FIGS. 9A and 9B are diagrams illustrating another example of time resource allocation of a shared channel.

DESCRIPTION OF EMBODIMENTS (FR)

In NR, it has been studied to use a frequency band up to 52.6 GHz. In NR after Rel. 16, it is considered to use a frequency band above 52.6 GHz. Note that the frequency band may be appropriately referred to as a frequency range (FR).

Figure 1:
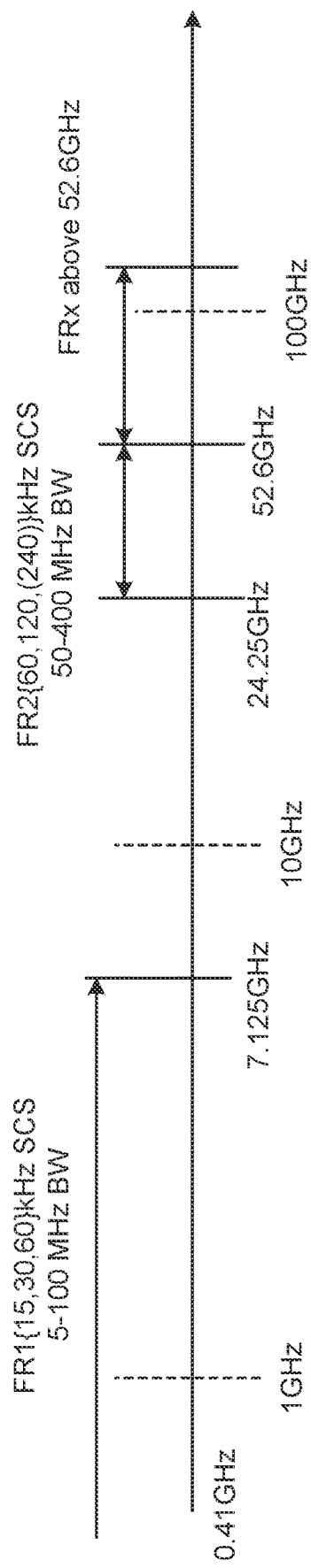
FIG. 1 is a diagram illustrating an example of an FR.

FIG. 1 is a diagram illustrating an example of an FR. As illustrated in FIG. 1, a target FR (FRx (x is an arbitrary character string)) is, for example, 52.6 GHz to 114.25 GHz. Note that as a frequency range in NR, FR1 is 410 MHz to 7.152 GHz, and FR2 is 24.25 GHz to 52.6 GHz. In addition, a frequency range higher than 52.6 GHz (for example, 52.6 GHz to 114.25 GHz) may be referred to as FR4.

In a frequency band higher than 52.6 GHz, it is assumed that a phase noise increases and a propagation loss increases. In addition, it is assumed that at least one of a peak-to-average power ratio (PAPR) and a PA having non-linearity has high sensitivity.

In consideration of the above-described matters, in a frequency band higher than 52.6 GHz (or a waveform for above 52.6 GHz), a configuration in which a subcarrier spacing is wider (for example, at least one of CP-OFDM and DFT-S-OFDM) is conceivable.

For example, in a high frequency band, in a case where the subcarrier spacing is widened while maintaining the number of symbols constituting one slot (for example, 14 symbols/1 slot), it is assumed that at least one of the symbol duration, the CP duration, and the slot duration is shortened (see FIG. 2).

FIG. 2 is a diagram illustrating an example of a symbol duration in each subcarrier spacing. In FIG. 2, 15 kHz, 30 kHz, 60 kHz, 120 kHz, 240 kHz, 480 kHz, and 960 kHz are exemplified as the subcarrier spacing, but other subcarrier spacings may be defined. In addition, the numerical values illustrated in FIG. 2 are an example, and are not limited thereto.

<Allocation of Control Resource Set>

Downlink control information (DCI) used for scheduling DL data (for example, PDSCH) or UL data (for example, the PUSCH) is transmitted by using a downlink control channel (for example, PDCCH) allocated in a control resource set (CORESET).

As described above, it is assumed that the symbol duration and the slot duration are shortened by configuring the subcarrier spacing to be wide in the high frequency band. In this case, it is also conceivable that the resource allocation duration in the time domain (also referred to as time-domain resource allocation (TDRA)) of the control resource set is controlled based on a given slot unit (for example, x-slot level (X≥1)).

For example, a first method in which one PDCCH (or a control resource set) is transmitted over a slot boundary (one PDCCH cross slot boundary transmission) or a second method in which a plurality of PDCCHs transmitted in each slot is aggregated (PDCCH repetition with slot aggregation) is assumed (see FIGS. 3A and 3B).

FIG. 3A illustrates an example of the first method in which one PDCCH is transmitted (or allocated) over slots #n to #n+2. The PDCCH (or the control resource set) allocated in each slot may be allocated in the entire time domain (for example, all symbols) in the slot, or may be allocated in a part of the time domain (for example, some symbols that are consecutive or non-consecutive).

FIG. 3B illustrates an example of the second method in which the PDCCH is repeatedly transmitted (or allocated) in slots #n to #n+2. Note that the repetitive transmission of the PDCCH may be read as multiple transmissions of the PDCCH. The PDCCH (or the control resource set) allocated in each slot may be allocated in the entire time domain (for example, all symbols) in the slot, or may be allocated in a part of the time domain (for example, some symbols that are consecutive or non-consecutive).

In the first method, the allocation of the shared channel may be determined based on one piece of schedule information notification of which is given by one PDCCH transmitted (or allocated) over a plurality of slots. The schedule information may be information applied to transmission and reception of a shared channel (PDSCH or PUSCH) such as allocation information regarding resource allocation in the time direction (time domain resource assignment).

In the second method, the allocation of the shared channel may be determined based on schedule information notification of which is given by each PDCCH transmitted in each slot (or in units of slots). The PDCCH transmitted (or allocated) in a plurality of slots may be referred to as PDCCH repetition transmission or multiple PDCCH transmission. In the PDCCH repetition transmission, it may be considered that one PDCCH is repeatedly transmitted for each slot, or it may be considered that there is a plurality of PDCCHs transmitted in different slots.

In addition, the PDCCH transmitted in each slot may schedule the same transport block (or a PDSCH or a PUSCH that transmits the same transport block). In this case, the schedule information notification of which is given by the PDCCH transmitted in each slot may be the same or may be at least partially different.

Meanwhile, in an existing system (for example, Rel. 15), resource allocation of a shared channel (for example, PDSCH or PUSCH) is controlled based on a PDCCH (or control resource set) allocated within one slot. For example, the UE determines the allocation position of the shared channel based on the resource allocation information included in the DCI transmitted by the PDCCH allocated to a given slot (see FIG. 4).

Figure 4:
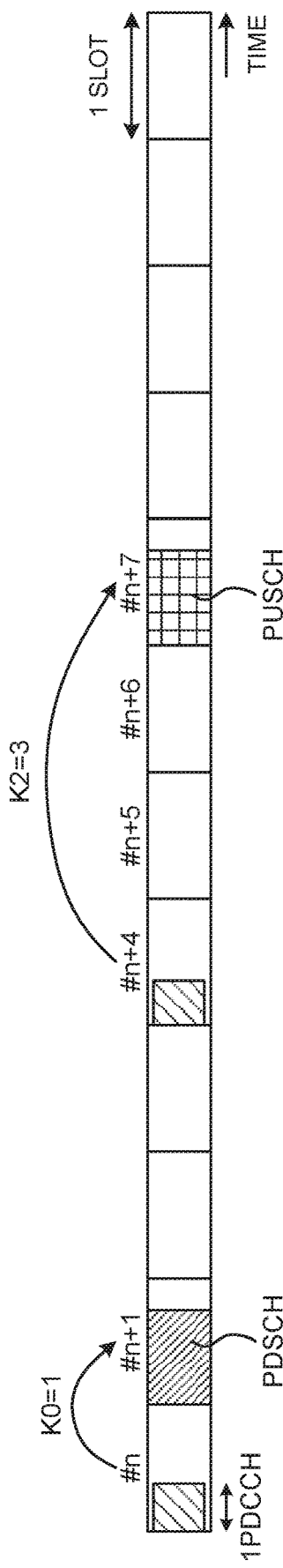
FIG. 4 is a diagram illustrating an example of resource allocation of a shared channel in an existing system.

FIG. 4 illustrates a case where the UE determines the timing of reception of the PDSCH based on the allocation information (time domain resource assignment) regarding the resource allocation in the time direction included in the PDCCH (or DCI) transmitted in slot #n. Here, a case where allocation information K0 included in the DCI is 1 is illustrated. K0 corresponds to a time gap between the PDCCH and the PDSCH, and is configured in units of slots.

The UE determines the resource allocation in the time direction of the PDSCH based on the allocation information (K0=1) by referring to timing (for example, a slot) at which the PDCCH (or DCI) is received as a reference point. Here, the resource allocation in the time direction of the PDSCH is slot #n+1.

In addition, FIG. 4 illustrates a case where the UE determines the timing of transmission of the PUSCH based on the allocation information regarding the resource allocation in the time direction included in the PDCCH (or DCI) transmitted in slot #n+4. Here, a case where allocation information K2 included in the DCI is 3 is illustrated. K2 corresponds to a time gap between the PDCCH and the PUSCH, and is configured in units of slots.

The UE determines the resource allocation in the time direction of the PUSCH based on the allocation information (K2=3) by referring to timing (for example, a slot) at which the PDCCH (or DCI) is received as a reference point. Here, the resource allocation in the time direction of the PUSCH is slot #n+4+3 (=#n+7).

As described above, in the existing system, the control resource set (or PDCCH) is not allocated over the slot boundary. Therefore, the resource allocation (or transmission/reception timing) of the shared channel can be determined using the slot in which the PDCCH is received as the reference point.

On the other hand, when the PDCCH is transmitted (or allocated) using a plurality of slots as described above, how to configure the reference point and determine the allocation of the shared channel becomes a problem. When the reference point is not appropriately configured, there is a possibility that transmission or reception of the shared channel cannot be performed appropriately.

The present inventors have focused on a point that resource allocation control different from that of an existing system is required in a predetermined frequency (for example, higher than 52.6 GHz) and frequency band, and have conceived the invention of the present application.

Hereinafter, embodiments according to the present disclosure will be described in detail with reference to the drawings. Note that the following aspects may be used alone, or may be applied by combining at least two of them.

Note that, in the following description, the case of application to the FRx (for example, a given frequency range higher than 52.6 GHz (for example, FR4)) is described, but application to existing FR1, FR2, or other frequency ranges is also possible. In addition, in the following description, a slot will be described as an example of a time interval for transmitting the PDCCH, the PDSCH, or the PUSCH, but the time interval is not limited to the slot. The slot may be replaced with another time interval (for example, symbol) and applied.

(First Aspect)

In the first aspect, allocation control of a shared channel in a configuration in which one PDCCH (or control resource set) is allocated over a slot boundary (for example, the first method) will be described.

When the PDCCH is allocated over a plurality of slots, allocation of the shared channel (for example, PDSCH or PUSCH) may be controlled using a specific slot among the plurality of slots as a reference point. For example, the UE controls transmission or reception of the shared channel based on the information of the resource allocation in the time direction included in the DCI transmitted by the PDCCH allocated over a plurality of slots and a specific slot in which the reference point is configured.

FIGS. 5A and 5B are diagrams illustrating an example of a case where a reference point is configured in a specific slot among a plurality of slots. FIG. 5A illustrates a case where the reference point is configured in a head slot of the plurality of slots, and FIG. 5B illustrates a case where the reference point is configured in a last slot (or a tail slot) of the plurality of slots.

FIGS. 5A and 5B illustrate a case where a PDSCH is scheduled by a PDCCH (or DCI) transmitted over slots #n to #n+2 and a PUSCH is scheduled by a PDCCH (or DCI) transmitted over slots #5 to #n+7. The UE controls the timing of reception of the PDSCH or the timing of transmission of the PUSCH based on the information of resource allocation in the time direction transmitted using the PDCCH.

When allocating the PDSCH to slot #n+3, a network (for example, a base station) notifies the UE of a duration from the reference point configured in a specific slot to a slot (here, #n+3) to which the PDSCH is allocated. In FIG. 5A, since slot #n is the reference point, K0 notification of which is given by the PDCCH (or DCI) is 3. On the other hand, in FIG. 5B, since slot #n is the reference point, KG notification of which is given by the PDCCH (or DCI) is 1.

When allocating the PUSCH to slot #n+10, the base station notifies the UE of a duration from the reference point configured in a specific slot to a slot (here, #n+10) to which the PUSCH is allocated. In FIG. 5A, since slot #n+5 is the reference point, K2 notification of which is given by the PDCCH (or DCI) is 5. On the other hand, in FIG. 5B, since slot #n+7 is the reference point, K2 notification of which is given by the PDCCH (or DCI) is 3.

The slot in which the reference point is configured may be defined in a specification, or notification of the slot may be given from the base station to the UE by using higher layer signaling or the like. In addition, here, a case where the reference point is configured to be the same for the PDSCH and the PUSCH (the head or the last of the plurality of slots) is indicated, but it is not limited thereto.

For example, the head slot among the plurality of slots in which the PDCCH is transmitted may be configured as the reference point for the allocation of the PDSCH, and the last slot among the plurality of slots in which the PDCCH is transmitted may be configured as the reference point for the allocation of the PUSCH. Alternatively, the last slot among the plurality of slots in which the PDCCH is transmitted may be configured as the reference point for the allocation of the PDSCH, and the head slot among the plurality of slots in which the PDCCH is transmitted may be configured as the reference point for the allocation of the PUSCH.

FIGS. 5A and 5B illustrate the case where the head slot or the last slot among the plurality of slots in which the PDCCH is transmitted is configured as the reference point, but it is not limited thereto. A slot in the middle of the plurality of slots in which the PDCCH is transmitted may be configured as the reference point, or a slot other than the plurality of slots in which the PDCCH is transmitted may be configured as the reference point.

Here, the case where the time interval for giving notification of the resource allocation (K0 or K2) in the time direction is in units of slots has been described as an example, but the notification of the resource allocation may be given in units of symbols as the time interval.

As described above, in a case where a PDCCH (or the control resource set) is transmitted over a plurality of slots, reception or transmission of the shared channel can be appropriately controlled by configuring a specific slot as the reference point and controlling resource allocation in the time direction of the shared channel.

(Second Aspect)

In the second aspect, allocation control of a shared channel in a configuration in which a PDCCH (or a control resource set) is transmitted in a plurality of slots or symbols (for example, the second method) will be described.

Note that, in the following description, a case where a PDCCH (for example, PDCCH for scheduling the same transport block or the like (or PDSCH)) is repeatedly transmitted in different slots will be described, but it is not limited thereto. A symbol may be applied as the time interval instead of the slot.

When a PDCCH used for scheduling a shared channel (for example, PDSCH or PUSCH) is repeatedly transmitted in a plurality of slots, each slot in which the PDCCH is transmitted may be configured as the reference point (Option 1). Alternatively, a specific slot among a plurality of slots in which the PDCCH is transmitted may be configured as the reference point (Option 2). Note that the information regarding the allocation of the PDCCH (for example, the number of times of repetition, PDCCH repetition transmission pattern, and the like) may be defined in the specification, or notification of the information may be given from the base station to the UE using at least one of the DCI and higher layer signaling.

<Option 1>

For the resource allocation information (for example, K0 or K2) in the time direction notification of which is given by the PDCCH transmitted in each slot, the UE may control the allocation of the shared channel using the slot in which the PDCCH is transmitted as the reference point (see FIG. 6A).

FIG. 6A illustrates a case where the PDCCH is transmitted in each of slots #n, #n+1, and #n+2, and the PDSCH is scheduled in slot #n+3 by the PDCCH transmitted in each of slots #n, #n+1, and #n+2.

Here, the reference point of the resource allocation in the time direction notification of which is given by the PDCCH (or DCI) transmitted in slot #n is slot #n. The reference point of the resource allocation in the time direction notified by the PDCCH transmitted in slot #n+1 is slot #n+1, and the reference point of the resource allocation in the time direction notification of which is given by the PDCCH transmitted in slot #n+2 is slot #n+2.

Therefore, notification of K0=3 is given by the PDCCH transmitted in slot #n, notification of K0=2 is given by the PDCCH transmitted in slot #n+1, and notification of K0=1 is given by the PDCCH transmitted in slot #n+2. That is, K0 notification of which is given by each PDCCH has a different value.

In addition, FIG. 6A illustrates a case where the PDCCH is transmitted in each of slots #n+5, #n+6, and #n+7, and the PUSCH is scheduled in slot #n+10 by the PDCCH transmitted in each of slots #n+5, #n+6, and #n+7.

Here, the reference point of the resource allocation in the time direction notification of which is given by the PDCCH (or DCI) transmitted in slot #n+5 is slot #n+5. The reference point of the resource allocation in the time direction notification of which is given by the PDCCH transmitted in slot #n+6 is slot #n+6, and the reference point of the resource allocation in the time direction notification of which is given by the PDCCH transmitted in slot #n+7 is slot #n+7.

Therefore, notification of K2=5 is given by the PDCCH transmitted in slot #n+5, notification of K2=4 is given by the PDCCH transmitted in slot #n+6, and notification of K2=3 is given by the PDCCH transmitted in slot #n+7. That is, K2 notification of which is given by each PDCCH has a different value.

A starting position (S) and a symbol length (L) of the PDSCH designated by the PDCCH transmitted in each slot (or PDCCH repetition transmission) may have the same value. Alternatively, when a table (also referred to as an SLIV table) in which candidates for the starting position (S) and the symbol length (L) of the PDSCH are defined is used, the indices of the SLIV tables designated by each PDCCH may have the same value. When the starting position and the symbol length (or different indices) of a different PDSCH are designated by each PDCCH, the UE may determine that it is an error case.

<Option 2>

For the resource allocation information (for example, K0 or K2) in the time direction notification of which is given by the PDCCH transmitted in each slot, the UE may control the allocation of the shared channel using a specific slot as the reference point (see FIG. 6B). FIG. 6B illustrates a case where the head slot of the slots in which the PDCCH (or repetitive PDCCH) is transmitted is the reference point.

FIG. 6B illustrates a case where the PDCCH is transmitted in each of slots #n, #n+1, and #n+2, and the PDSCH is scheduled in slot #n+3 by the PDCCH transmitted in each of slots #n, #n+1, and #n+2.

Here, the reference point of the resource allocation in the time direction notification of which is given by the PDCCH (or DCI) transmitted in slot #n is specific slot #n. In addition, the reference point of the resource allocation in the time direction notification of which is given by the PDCCH transmitted in each of slots #n+1 and #n+2 is also specific slot #n.

Therefore, notification of K0=3 is given by the PDCCH transmitted in each of slots #n, #n+1, and #n+2. That is, K0 notification of which is given by each PDCCH has the same value.

In addition, FIG. 6B illustrates a case where the PDCCH is transmitted in each of slots #n+5, #n+6, and #n+7, and the PUSCH is scheduled in slot #n+10 by the PDCCH transmitted in each of slots #n+5, #n+6, and #n+7.

Here, the reference point of the resource allocation in the time direction notification of which is given by the PDCCH (or DCI) transmitted in slot #n+5 is specific slot #n+5. In addition, the reference point of the resource allocation in the time direction notification of which is given by the PDCCH transmitted in each of slots #n+6 and #n+7 is also specific slot #n+5.

Therefore, notification of K2=5 is given by the PDCCH transmitted in each of slots #n+5, #n+6, and #n+7. That is, K2 notification of which is given by each PDCCH has the same value.

It is also conceivable that the UE succeeds in receiving (for example, decoding processing) only some (for example, one) PDCCHs among a plurality of PDCCHs (for example, repeatedly transmitted PDCCHs). In this case, the UE may assume that the allocation information (for example, K0 or K2) notification of which is given by the PDCCH is a duration (or gap) between the specific slot and the shared channel. For example, in FIG. 6B, when the UE has successfully received only the PDCCH in slot #n+1, the reception of the PDSCH may be controlled by determining that a specific slot (for example, the head slot of the repeated transmission) is the reference point for K0 notification of which is given by the PDCCH.

In addition, in a case where at least one PDCCH among a plurality of PDCCHs (for example, repeatedly transmitted PDCCHs) is successfully received, the UE may perform control not to perform or skip reception processing (for example, monitoring processing, decoding processing, or the like) for the remaining PDCCHs. For example, in FIG. 6B, when the UE fails to receive the PDCCH in slot #n and succeeds to receive the PDCCH in slot #n+1, the reception processing for the PDCCH in slot #n+2 may be skipped.

Note that FIG. 6B illustrates a case where the head slot of the slots in which the PDCCH (or repetitive PDCCH) is transmitted is the reference point, but it is not limited thereto. The last slot (for example, slot #n+2 or slot #n+7) among the slots in which the PDCCH is transmitted may be configured as the reference point, or another slot may be configured as the reference point.

(Third Aspect)

In the third aspect, a case where a plurality of shared channels is scheduled in a configuration in which a PDCCH (or a control resource set) is transmitted in a plurality of slots or symbols (for example, the second method) will be described.

Note that, in the following description, a case where a PDCCH (for example, PDCCH for scheduling the same transport block or the like (or PDSCH)) is repeatedly transmitted in different slots will be described, but it is not limited thereto. A symbol may be applied as the time interval instead of the slot. In addition, in the following description, the PDSCH is taken as an example of the shared channel, but the same can apply to the PUSCH. For example, PDSCH may be replaced with PUSCH, K0 may be replaced with K2, and reception may be replaced with transmission. In addition, in the third aspect, the configuration of the reference point described in the second aspect may be appropriately used.

<Designation of Allocation of One PDSCH by Plurality of PDCCHs>

Figure 7:
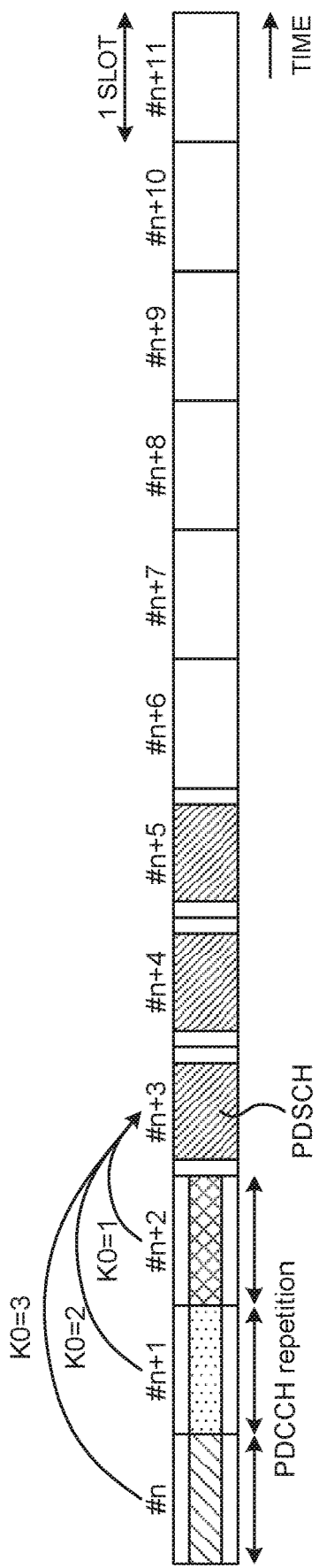
FIG. 7 is a diagram illustrating another example of time resource allocation of a shared channel.

FIG. 7 illustrates a case where both the PDCCH and the PDSCH scheduled by the PDCCH are transmitted in a plurality of slots (or repetitive transmission is applied). The PDSCH may be a PDSCH used for transmission of the same data (for example, a transport block). Note that the information regarding at least one of the allocation of the PDCCH (for example, the number of times of repetition, PDCCH repetition transmission pattern, and the like) and the allocation of the PDSCH (the number of times of repetition, PDSCH repetition transmission pattern, and the like) may be defined in the specification, or notification of the information may be given from the base station to the UE using at least one of the DCI and higher layer signaling.

When notification of the time resource allocation information of the PDSCH is given by the PDCCH, the time resource allocation (K0) may be designated only for a specific PDSCH (or PDSCH transmitted in a specific slot) among the plurality of PDSCHs. The specific slot may be a head slot or a last slot among a plurality of slots in which the PDSCH is transmitted.

FIG. 7 illustrates a case where the head slot (#n+3) among the plurality of slots #n+3 to #n+5 in which the PDSCH is transmitted is designated by each PDCCH. The UE determines the head slot for the PDSCH repetition transmission based on the allocation information notification of which is given by the PDCCH transmitted in slots #n, #n+1, and #n+2. In addition, the UE may control the reception of the PDSCH on the assumption that the PDSCH is transmitted in consecutive slots (or non-consecutive slots) based on the number of times of repetition of the PDSCH.

FIG. 7 illustrates a case where the reference point of the allocation information (K0) transmitted by the PDCCH is configured in each slot (for example, Option 1 of the second aspect), but it is not limited thereto. The reference point may be configured in a specific slot (for example, Option 2 of the second aspect).

Thus, by designating a specific PDSCH (for example, the head PDSCH) within the PDSCH repetition transmissions using a plurality of PDCCHs, the UE can determine the head slot of the PDSCH even when some of the PDCCHs are erroneously detected.

<Designation of Allocation of One or More PDSCHs by One or More PDCCHs>

One or a plurality of PDCCHs may designate allocation (for example, K0) of one or a plurality of PDSCHs. For example, a PDSCH whose allocation (for example, K0) is designated by one or a plurality of PDCCHs may be controlled according to a relationship between the number of times of repetition of the PDCCH (or the number of slots in which the PDCCH is transmitted) and the number of times of repetition of the PDSCH (or the number of slots in which the PDSCH is transmitted).

[Case 1]

It is assumed that the number of times of repetition of a PDCCH (N_PDCCH) and the number of times of repetition of a PDSCH (N_PDSCH) are the same (N_PDCCH=N_PDSCH) (see FIG. 8A). In this case, one PDCCH may designate the resource allocation (or slot timing) in the time direction of one PDSCH. That is, the PDCCH and the PDSCH may be associated on a one-to-one basis.

In FIG. 8A, the resource allocation (K0=3) in the time direction of the PDSCH transmitted in slot #n+3 is designated using the PDCCH transmitted in slot #n. Similarly, the resource allocation (K0=3) in the time direction of the PDSCH transmitted in slot #n+4 is designated using the PDCCH transmitted in slot #n+1, and the resource allocation (K0=3) in the time direction of the PDSCH transmitted in slot #n+5 is designated using the PDCCH transmitted in slot #n+2.

[Case 2]

It is assumed that the number of times of repetition of a PDCCH (N_PDCCH) is larger than the number of times of repetition of a PDSCH (N_PDSCH) (N_PDCCH>N_PDSCH) (see FIG. 8B). In this case, a plurality of PDCCHs may designate the resource allocation (or slot timing) in the time direction of one PDSCH. FIG. 8B illustrates a case where the number of times of repetition of a PDCCH is an integral multiple (for example, double) of the number of times of repetition of a PDSCH.

In FIG. 8B, the resource allocation in the time direction of the PDSCH transmitted in slot #n+6 is designated using the PDCCH transmitted in slots #n and #n+3. Here, since the slot in which each PDCCH is transmitted is configured as the reference point, K0=6 is designated by the PDCCH transmitted in slot #n, and K0=3 is designated by the PDCCH transmitted in slot #n+3.

Similarly, the resource allocation in the time direction of the PDSCH transmitted in slot #n+7 is designated using the PDCCH transmitted in slots #n+1 and #n+4. Here, K0=6 is designated by the PDCCH transmitted in slot #n+1, and K0=3 is designated by the PDCCH transmitted in slot #n+4. In addition, the resource allocation in the time direction of the PDSCH transmitted in slot #n+8 is designated using the PDCCH transmitted in slots #n+2 and #n+5. Here, K0=6 is designated by the PDCCH transmitted in slot #n+2, and K0=3 is designated by the PDCCH transmitted in slot #n+5.

As described above, by designating the resource allocation (or transmission timing) of one PDSCH using a plurality of PDCCHs, the UE can appropriately determine the allocation of the PDSCH even in a case where some PDCCHs are erroneously detected.

[Case 3]

It is assumed that the number of times of repetition of a PDCCH (N_PDCCH) is smaller than the number of times of repetition of a PDSCH (N_PDSCH) (N_PDCCH<N_PDSCH) (see FIGS. 9A and 9B). In this case, one PDCCH may designate the resource allocation (or slot timing) in the time direction of one or more PDSCHs. FIGS. 9A and 9B illustrate a case where the number of times of repetition of a PDSCH is an integral multiple (for example, double) of the number of times of repetition of a PDCCH.

In FIG. 9A, the resource allocation in the time direction of the PDSCH transmitted in slot #n+3 is designated using the PDCCH transmitted in slot #n. Here, since the slot in which each PDCCH is transmitted is configured as the reference point, K0=3 is designated by the PDCCH transmitted in slot #n.

Similarly, the resource allocation in the time direction of the PDSCH transmitted in slot #n+5 is designated using the PDCCH transmitted in slot #n+1. Here, since the slot in which each PDCCH is transmitted is configured as the reference point, K0=4 is designated by the PDCCH transmitted in slot #n+1. In addition, the resource allocation in the time direction of the PDSCH transmitted in slot #n+7 is designated using the PDCCH transmitted in slot #n+2. Here, since the slot in which each PDCCH is transmitted is configured as the reference point, K0=5 is designated by the PDCCH transmitted in slot #n+2.

The same beam (or TCI state) may be applied to the PDCCH and the PDSCH scheduled by the PDCCH. The TCI state is information regarding quasi-co-location (QCL) of a signal/channel, and may also be referred to as a spatial reception parameter, spatial relation information, or the like. The TCI state may be configured in the UE for each channel or each signal. In addition, the TCI state may be configured (given in instruction) by higher layer signaling, physical layer signaling, or a combination thereof.

The UE may determine that the beam (or TCI state) applied to the PDSCH is the same as or associated with the beam applied to the corresponding PDCCH. In addition, the UE may assume that a PDSCH to which the same beam is applied is transmitted until receiving a PDSCH scheduled by another PDCCH (or designated by the resource allocation in the time direction).

For example, as illustrated in FIG. 9A, it is assumed that the PDSCH allocation in slot #n+3 (K0=3) is designated by the PDCCH in slot #n, and the PDSCH allocation in slot #n+5 (K0=4) is designated by the PDCCH in slot #n+1. In such a case, the UE may assume that the PDSCH to which the same beam (or TCI) as #n+3 is applied is allocated in slot #n+4 in which the PDSCH allocation instruction is not given.

As described above, by adopting a configuration in which the PDSCH to which the same beam is applied is continuously transmitted, it is possible to reduce the switching operation of the beam (for example, the reception beam) when beam cycling is applied.

Alternatively, an allocation pattern of a plurality of PDSCHs (or repetition of PDSCH) scheduled by a plurality of PDCCHs (or repetition of PDCCH) may be controlled to be repeated (see FIG. 9B). FIG. 9B illustrates a case where the allocation of the PDSCH in slot #n+3 is designated using the PDCCH transmitted in slot #n, the allocation of the PDSCH in slot #n+4 is designated using the PDCCH transmitted in slot #n+1, and the allocation of the PDSCH in slot #n+5 is designated using the PDCCH transmitted in slot #n+2.

In this case, the same beam (or TCI state) may be applied to the PDCCH and the corresponding PDSCH. In addition, in a case where the number of times of repetition of the PDSCH is larger than the number of times of repetition of the PDCCH, the same pattern may be applied to the remaining PDSCH transmissions. Here, in slot #n+6, the PDSCH to which the same beam (for example, beam 1) as that in slot #n+3 is applied is transmitted. Similarly, the PDSCH to which the same beam (for example, beam 2) as that in slot #n+4 is applied is transmitted in slot #n+7, and the PDSCH to which the same beam (for example, beam 3) as that in slot #n+5 is applied is transmitted in slot #n+8.

Note that the configuration of the number of times of repetition of the PDCCH and the number of times of repetition of the PDSCH may be limited to at least one of Cases 1 to 3. For example, the UE may assume that the number of times of repetition of the PDCCH and the number of times of repetition of the PDSCH are configured to be the same (for example, Case 1 is applied).

<Positions of Plurality of PDCCHs and Plurality of PDCCHs>

In a case where a plurality of PDSCHs (for example, PDSCH repetition transmission) is scheduled using a plurality of PDCCHs (for example, PDCCH repetition transmission), the PDSCH may be allocated after all the PDCCHs in the time direction (Option 1). Alternatively, the PDSCH may be allocated before some of the PDCCHs (Option 2).

[Option 1]

Figure 10:
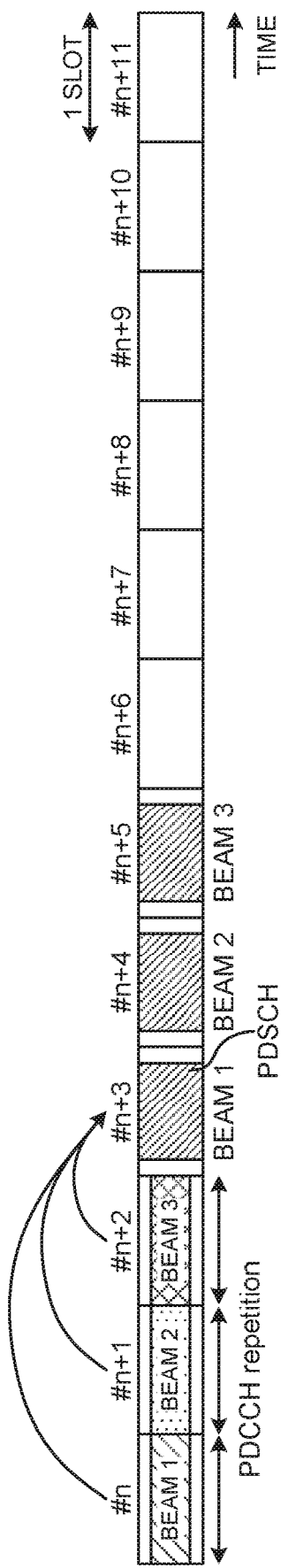
FIG. 10 is a diagram illustrating another example of time resource allocation of a shared channel.

The control may be performed such that the PDSCH allocated first in the time direction among the plurality of PDSCHs is allocated after the PDCCH transmitted last in the time direction among the plurality of PDCCHs (see FIG. 10). For example, as illustrated in FIG. 10, among the PDCCHs transmitted in slots #n to #n+2, the repetitive transmission of the PDSCH may be scheduled in the slot or symbol after the PDCCH of slot #n+2 transmitted last.

The UE may perform the PDSCH reception processing on the assumption that the first PDSCH of the PDSCH repetition is not scheduled in the slot or symbol before the last PDCCH of the PDCCH repetition. For example, the UE may skip reception processing (for example, decoding or the like) for the shared channel in a duration in which repetition of the PDCCH is received (or a duration in which repetition of the PDCCH is monitored).

The UE may determine the head slot of the repeatedly transmitted shared channel based on the resource allocation information (for example, K0 or K2) in the time direction notification of which is given from at least one PDCCH (or DCI). FIG. 10 illustrates a case where the head slot of the PDSCH to which the repetitive transmission is applied is designated by a plurality of PDCCHs. In addition, the PDSCH may be repeated in consecutive slots.

[Option 2]

Figure 11:
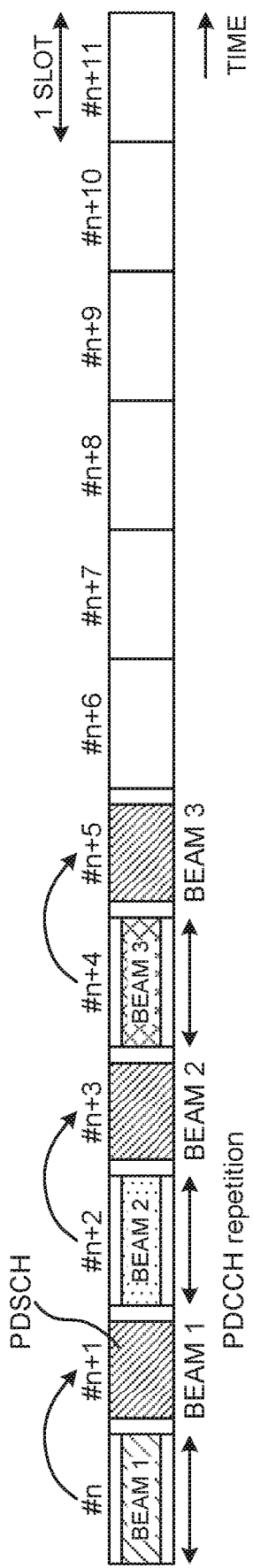
FIG. 11 is a diagram illustrating another example of time resource allocation of a shared channel.

At least one PDSCH of the plurality of PDSCHs may be controlled to be allocated prior to at least one PDCCH of the plurality of PDCCHs (see FIG. 11). In this case, the correspondence relationship between the PDCCH and the PDSCH may be controlled according to the relationship between the number of times of repetition of the PDCCH (or the number of slots in which the PDCCH is transmitted) and the number of times of repetition of the PDSCH (or the number of slots in which the PDSCH is transmitted).

[Case 1]

It is assumed that the number of times of repetition of a PDCCH (N_PDCCH) and the number of times of repetition of a PDSCH (N_PDSCH) are the same (N_PDCCH=N_PDSCH). In this case, a combination pattern of one PDCCH and a PDSCH scheduled by the PDCCH may be continuously configured (see FIG. 11). For example, the PDSCH in slot #n+1 is scheduled by the PDCCH transmitted in slot #n. In addition, the PDSCH in slot #n+3 is scheduled by the PDCCH transmitted in slot #n+2, and the PDSCH in slot #n+5 is scheduled by the PDCCH transmitted in slot #n+4.

When repetition of two PDSCHs is scheduled, the UE may assume that the PDCCH is transmitted between transmission of the two PDSCHs. In other words, it may not be assumed that the two PDSCHs are scheduled without transmission of the PDCCH between the transmission of the two PDSCHs.

In addition, when repetition of two PDCCHs is scheduled, it may be assumed that the PDSCH is transmitted between the transmission of the two PDCCHs. In other words, it may not be assumed that the two PDCCHs are scheduled without transmission of the PDSCH between the transmission of the two PDCCHs.

[Case 2]

It is assumed that the number of times of repetition of a PDCCH (N_PDCCH) is larger than the number of times of repetition of a PDSCH (N_PDSCH)

(N_PDCCH>N_PDSCH). In this case, a combination pattern of one or a plurality of PDCCHs and a PDSCH scheduled by the PDCCHs may be continuously configured.

For example, in a case where the number of times of repetition of the PDCCH is an integral multiple (for example, double) of the number of times of repetition of the PDSCH, a combination pattern of two PDCCHs and a PDSCH scheduled by at least one of the two PDCCHs may be continuous.

[Case 3]

It is assumed that the number of times of repetition of a PDCCH (N_PDCCH) is smaller than the number of times of repetition of a PDSCH (N_PDSCH) (N_PDCCH<N_PDSCH). In this case, a combination pattern of one PDCCH and one or a plurality of PDSCHs scheduled by the PDCCH may be continuously configured.

For example, in a case where the number of times of repetition of the PDSCH is an integer multiple (for example, double) of the number of times of repetition of the PDCCH, a combination pattern of one PDCCH and two PDSCHs scheduled by the PDCCH may be continuous.

The UE may determine the head slot of the repeatedly transmitted shared channel based on the resource allocation information (for example, K0 or K2) in the time direction notification of which is given from at least one PDCCH (or DCI). In addition, the PDSCH may be repeated in consecutive slots.

In addition, the same beam (or TCI state) may be applied to the PDCCH and the PDSCH scheduled by the PDCCH. In this case, by adopting a configuration in which the PDCCH and the PDSCH to which the same beam is applied are allocated continuously, it is possible to reduce the switching operation of the beam (for example, the reception beam) when beam cycling is applied.

(Others)

In the present specification and the drawings, the beam may be read as at least one of a TCI state, a QCL relation, a given index, and a given resource. In addition, the first to third aspects can be implemented in both a configuration in which the beam is applied and a configuration in which the beam is not applied. In addition, for the PDSCH and the PUSCH, the configurations described in the first to third aspects may be applied in common, or different configurations may be applied.

The FR4 may be divided into a plurality of portions (for example, sub-frequency ranges or sub-FRs). For example, the above aspect (for example, a configuration different from that of Rel. 15) may be applied to a subband exceeding a given frequency (for example, 52.6 GHz).

Alternatively, the above aspect (for example, a configuration different from that of Rel. 15) may be applied to some subbands exceeding a given frequency (for example, 52.6 GHz), and the same configuration as that of the existing system (for example, Rel. 15) may be applied to the other subbands. In this case, different configurations may be applied between some subbands. In addition, the same configuration as that of the existing system (for example, Re. 15) may be applied to a subband having a relatively low frequency among a plurality of subbands exceeding a given frequency, and the above aspect may be applied to a subband having a relatively high frequency.

(Radio Communication System)

Hereinafter, a configuration of a radio communication system according to one embodiment of the present disclosure will be described. In the radio communication system, communication is performed by using one or a combination of the radio communication methods according to the embodiments of the present disclosure.

Figure 12:
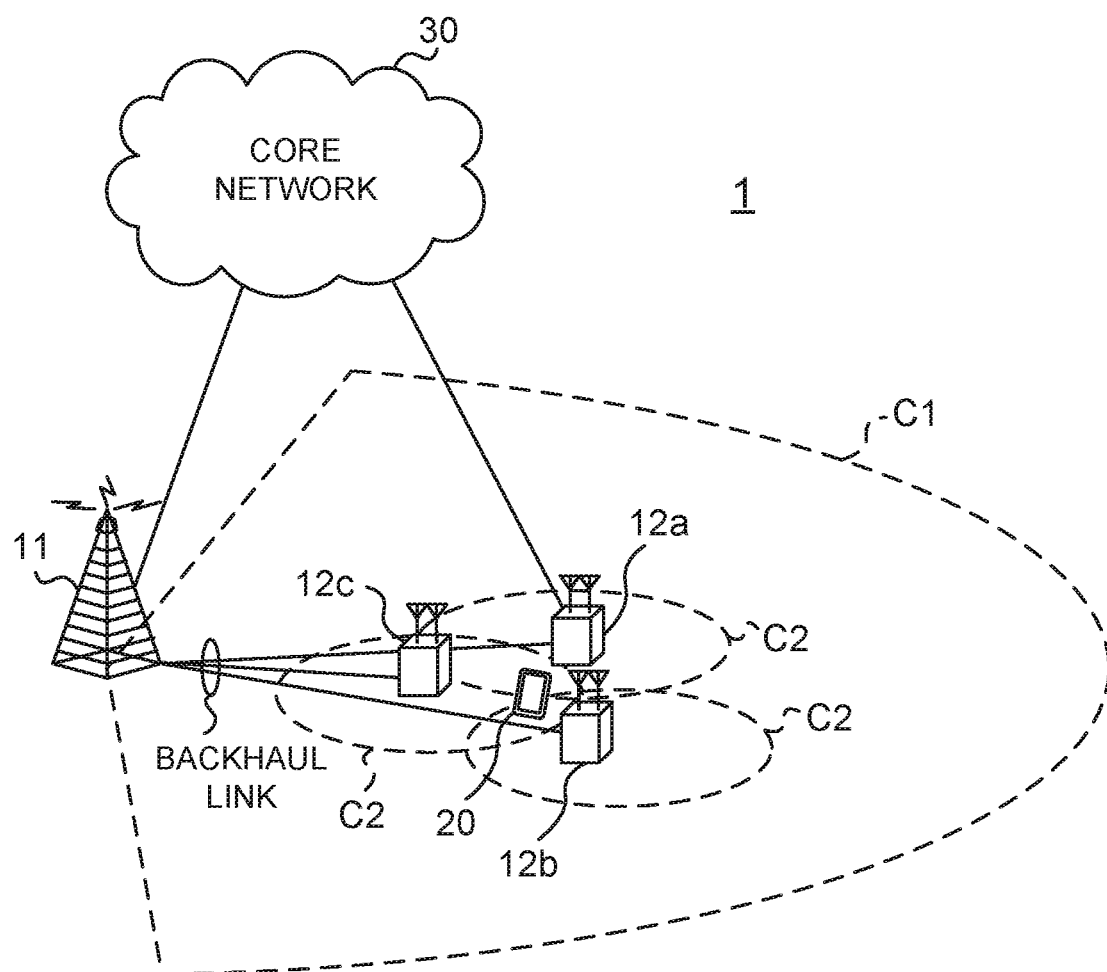
FIG. 12 is a diagram illustrating an example of a schematic configuration of a radio communication system according to one embodiment.

FIG. 12 is a diagram illustrating an example of a schematic configuration of a radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SN). In NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNBs)) (NR-NR dual connectivity (NN-DC)).

The radio communication system 1 may include a base station 11 that forms a macro cell C1 with a relatively wide coverage, and base stations 12 (12a to 12c) that are allocated in the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings.

Hereinafter, the base stations 11 and 12 will be collectively referred to as base stations 10 unless specified otherwise.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range 1 (FR1) and a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of FR1 and FR2 are not limited to these, and for example, FR1 may be a frequency range higher than FR2.

Further, the user terminal 20 may perform communication on each CC using at least one of time division duplex (TDD) or frequency division duplex (FDD).

The plurality of base stations 10 may be connected by wire (for example, an optical fiber or an X2 interface in compliance with common public radio interface (CPRI)) or by radio (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

A base station 10 may be connected to a core network 30 via another base station 10 or directly. The core network 30 may include, for example, at least one of evolved packet core (EPC), 5G core network (5GCN), next generation core (NGC), and the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that, in the radio communication system 1, another radio access method (for example, another single carrier transmission method and another multi-carrier transmission method) may be used as UL and DL radio access methods.

In the radio communication system 1, as a downlink channel, a physical downlink shared channel (PDSCH) shared by each user terminal 20, a physical broadcast channel (PBCH), a physical downlink control channel (PDCCH), or the like may be used.

Further, in the radio communication system 1, as an uplink channel, an uplink shared channel (physical uplink shared channel (PUSCH)) shared by each user terminal 20, an uplink control channel (physical uplink control channel (PUCCH)), a random access channel (physical random access channel (PRACH)), and the like may be used.

User data, higher layer control information, and a system information block (SIB) and the like are transmitted by the PDSCH. The PUSCH may transmit user data, higher layer control information, and the like. Further, the PBCH may transmit a master information block (MIB).

Lower layer control information may be transmitted by the PDCCH. The lower layer control information may include, for example, downlink control information (DCI) including scheduling information for at least one of the PDSCH and the PUSCH.

Note that, the DCI for scheduling the PDSCH may be referred to as DL assignment, DL DCI, and the like, and the DCI for scheduling the PUSCH may be referred to as UL grant, UL DCI, and the like. Note that the PDSCH may be replaced with DL data, and the PUSCH may be replaced with UL data.

A control resource set (CORESET) and a search space may be used to detect the PDCCH. The CORESET corresponds to a resource that searches for DCI. The search space corresponds to a search area and a search method for PDCCH candidates. One CORESET may be associated with one or a plurality of search spaces. The UE may monitor a CORESET associated with a certain search space based on search space configuration.

One search space may correspond to a PDCCH candidate corresponding to one or a plurality of aggregation levels. One or a plurality of search spaces may be referred to as a search space set. Note that "search space", "search space set", "search space configuration", "search space set configuration", "CORESET", "CORESET configuration", and the like in the present disclosure may be replaced with each other.

Uplink control information (UCI) including at least one of channel state information (CSI), delivery confirmation information (which may be referred to as, for example, hybrid automatic repeat request acknowledgement (HARQ-ACK), ACK/NACK, or the like), scheduling request (SR), or the like may be transmitted on the PUCCH. A random access preamble for establishing connection with a cell may be transmitted by the PRACH.

Note that in the present disclosure, downlink, uplink, and the like may be expressed without "link". Further, various channels may be expressed without adding "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as the DL-RS.

The synchronization signal may be at least one of, for example, a primary synchronization signal (PSS) and a secondary synchronization signal (SSS). A signal block including the SS (PSS, SSS) and the PBCH (and the DMRS for the PBCH) may be referred to as an SS/PBCH block, an SS block (SSB), and the like. Note that the SS, the SSB, or the like may also be referred to as a reference signal.

Further, in the radio communication system 1, a measurement reference signal (sounding reference signal (SRS)), a demodulation reference signal (DMRS), and the like may be transmitted as an uplink reference signal (UL-RS). Note that the DMRS may be referred to as a "user terminal-specific reference signal (UE-specific Reference Signal)".

(Base Station)

Figure 13:
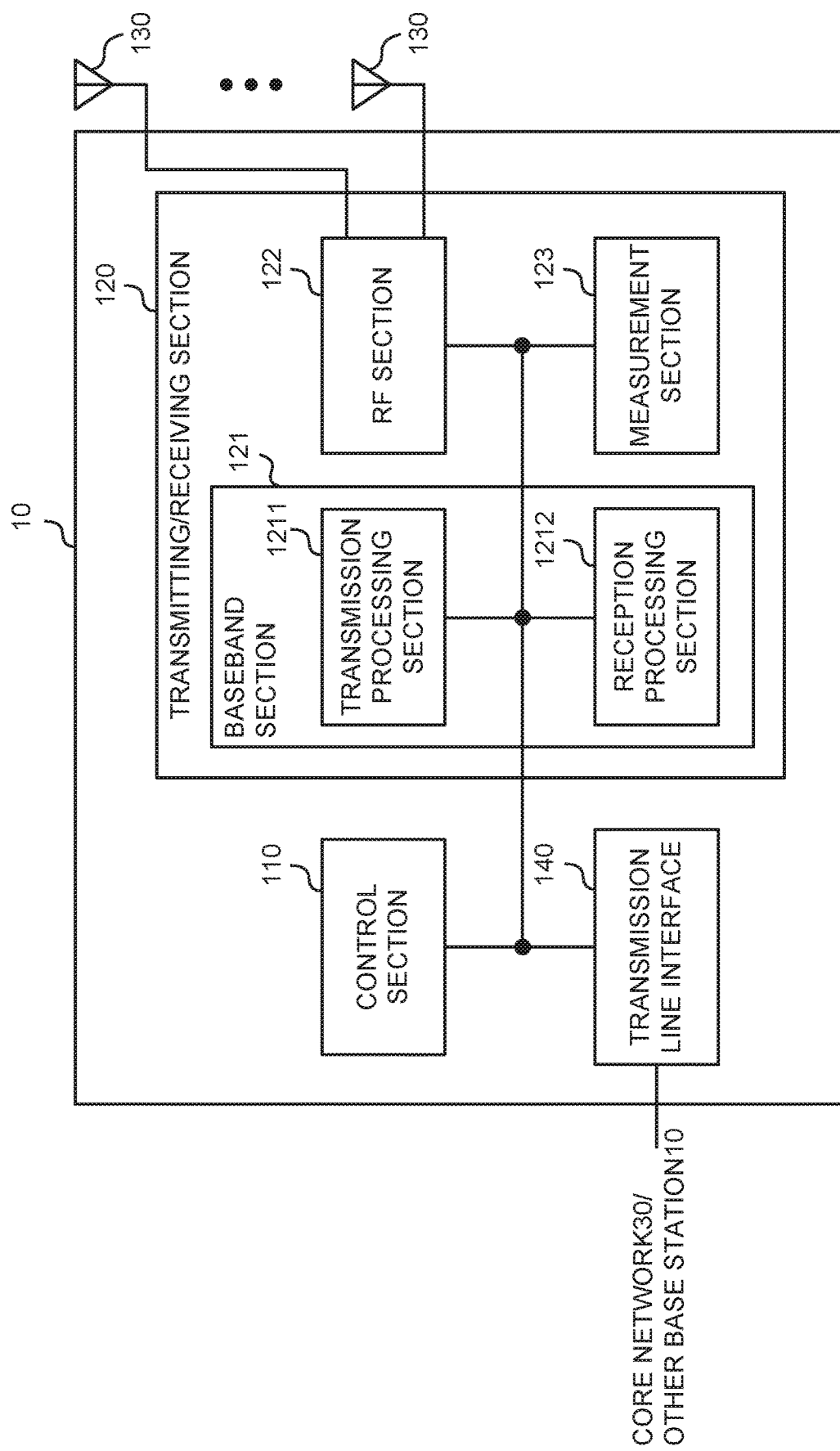
FIG. 13 is a diagram illustrating an example of a configuration of a base station according to one embodiment.

FIG. 13 is a diagram illustrating an example of a configuration of a base station according to one embodiment. The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be included.

Note that, although this example will primarily illustrate functional blocks that pertain to characteristic parts of the present embodiment, it may be assumed that the base station 10 has other functional blocks that are necessary for radio communication as well. A part of processing of each section described below may be omitted.

The control section 110 controls the entire base station 10. The control section 110 can include a controller, a control circuit, and the like that are described based on common recognition in the technical field related to the present disclosure.

The control section 110 may control signal generation, scheduling (for example, resource allocation, mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or release) of a communication channel, state management of the base station 10, management of a radio resource, and the like.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described based on common recognition in the technical field related to the present disclosure.

The transmitting/receiving section 120 may be formed as an integrated transmitting/receiving section, or may include a transmitting section and a receiving section. The transmitting section may be configured by the transmission processing section 1211 and the RF section 122. The receiving section may be configured by the reception processing section 1212, the RF section 122, and the measurement section 123.

The transmission/reception antenna 130 can include an antenna that is described based on common recognition in the technical field related to the present disclosure, for example, an array antenna or the like.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam and a reception beam by using digital beam forming (for example, precoding), analog beam forming (for example, phase rotation), or the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency range, filtering processing, amplification, and the like on the baseband signal, to transmit a signal in the radio frequency range via the transmission/reception antenna 130.

Meanwhile, the transmitting/receiving section 120 (RF section 122) may perform amplification, filtering processing, demodulation to a base band signal, and the like on the signal in the radio frequency band received by the transmission/reception antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired base band signal to acquire user data and the like.

The transmitting/receiving section 120 (measurement section 123) may perform measurement related to the received signal. For example, the measurement section 123 may perform radio resource management (RPM) measurement, channel state information (CSI) measurement, and the like based on the received signal. The measurement section 123 may measure received power (for example, reference signal received power (RSRP)), received quality (for example, reference signal received quality (RSRQ), signal to interference plus noise ratio (SINR), or signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmitting section and the receiving section of the base station 10 in the present disclosure may include at least one of the transmitting/receiving section 120, the transmission/reception antenna 130, and the transmission line interface 140.

Note that the transmitting/receiving section 120 transmits one or more shared channels scheduled using a downlink control channel allocated at a plurality of time intervals (for example, a slot or symbol). The transmitting/receiving section 120 may transmit information regarding at least one of the number of times of transmission of the PDCCH (for example, a repeated transmission factor) and the number of times of transmission of the shared channel (for example, a repeated transmission factor).

The control section 110 may control the allocation of the shared channel in the time direction based on the allocation information regarding the allocation of the shared channel in the time direction notification of which is given by the downlink control channel and the reference point configured in a specific slot among a plurality of slots.

(User Terminal)

Figure 14:
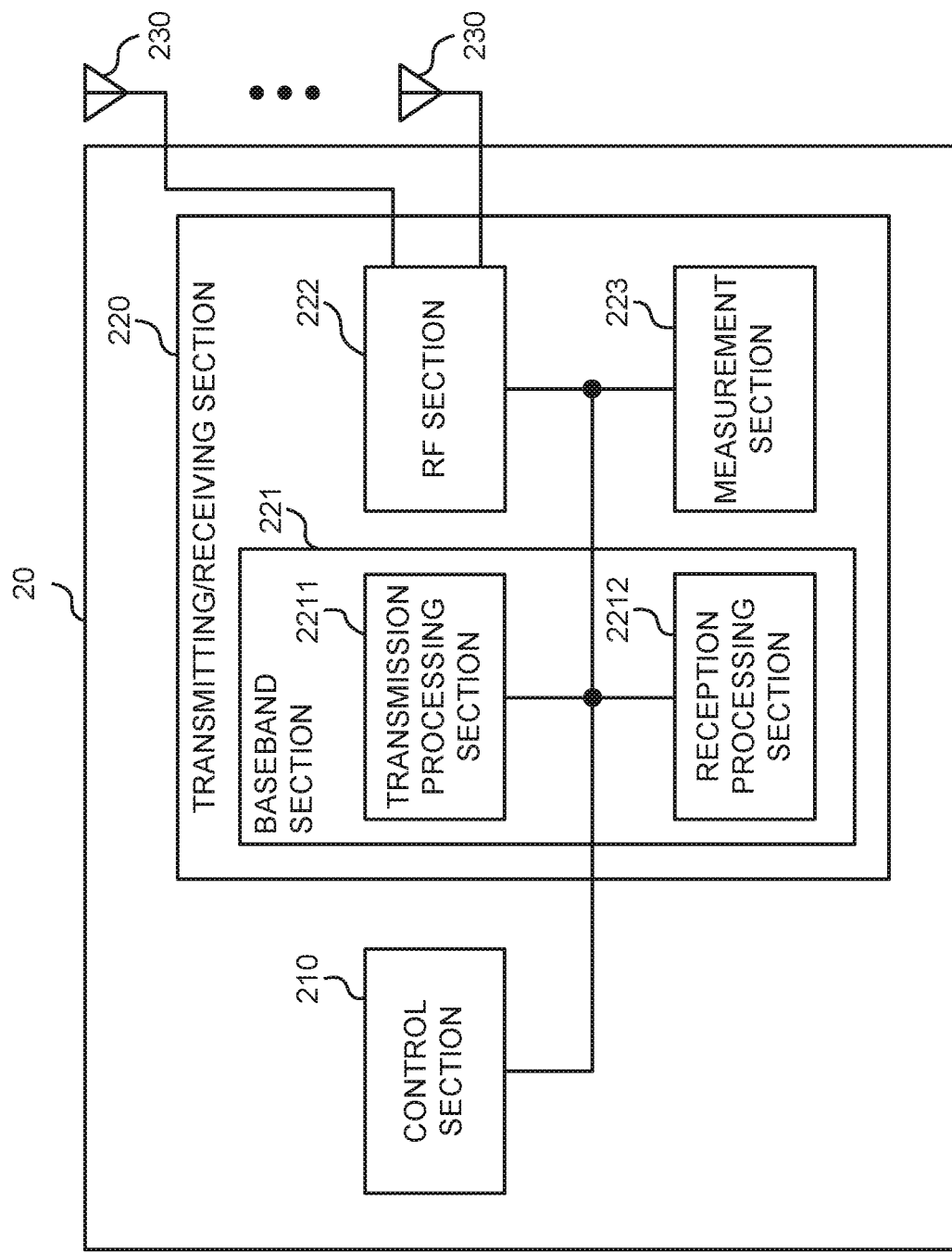
FIG. 14 is a diagram illustrating an example of a configuration of a user terminal according to one embodiment.

FIG. 14 is a diagram illustrating an example of a configuration of a user terminal according to one embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can include a controller, a control circuit, and the like that are described based on common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmission/reception circuit, and the like that are described based on common recognition in the technical field related to the present disclosure.

The transmitting/receiving section 220 may be formed as an integrated transmitting/receiving section, or may include a transmitting section and a receiving section. The transmitting section may be configured by the transmission processing section 2211 and the RF section 222. The receiving section may be configured by the reception processing section 2212, the RF section 222, and the measurement section 223.

The transmission/reception antenna 230 can include an antenna that is described based on common recognition in the technical field related to the present disclosure, for example, an array antenna or the like.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data, control information, and the like acquired from the control section 210, to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined based on configuration of transform precoding. In a case where transform precoding is enabled for a certain channel (for example, PUSCH), the transmitting/receiving section 220 (transmission processing section 2211) may perform DFT processing as the transmission processing in order to transmit the channel using a DFT-s-OFDM waveform. In a case where it is not the case, DFT processing need not be performed as the transmission processing.

The transmitting/receiving section 220 (RF section 222) may perform modulation to a radio frequency range, filtering processing, amplification, and the like on the baseband signal, to transmit a signal in the radio frequency range via the transmission/reception antenna 230.

Meanwhile, the transmitting/receiving section 220 (RF section 222) may perform amplification, filtering processing, demodulation to a baseband signal, and the like on the signal in the radio frequency range received by the transmission/reception antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure the received power (for example, RSRP), the received quality (for example, RSRQ, SINR, SNR, etc.), the signal strength (for example, RSSI), propagation path information (for example, CSI), and so on. The measurement result may be output to the control section 210.

Note that the transmitting section and the receiving section of the user terminal 20 in the present disclosure may include at least one of the transmitting/receiving section 220 or the transmission/reception antenna 230.

Note that the transmitting/receiving section 220 receives one or more shared channels scheduled using a downlink control channel allocated at a plurality of time intervals (for example, a slot or symbol). The transmitting/receiving section 220 may receive information regarding at least one of the number of times of transmission of the PDCCH (for example, a repeated transmission factor) and the number of times of transmission of the shared channel (for example, a repeated transmission factor).

The control section 210 determines (or decides) the allocation of the shared channel in the time direction based on the allocation information regarding the allocation of the shared channel in the time direction notification of which is given by the downlink control channel and the reference point configured in a specific slot among the plurality of slots.

When notification of one piece of allocation information is given by the downlink control channel, the specific slot may be the head slot or the last slot of the plurality of slots.

When the notification of the allocation information is given by the downlink control channel allocated in each slot, the control section 210 may apply a different reference point to each piece of allocation information (see, for example, FIG. 6A).

When the notification of the allocation information is given by the downlink control channel allocated in each slot, the control section 210 may apply the same reference point to each piece of allocation information (see, for example, FIG. 6B).

A plurality of shared channels may be scheduled by the downlink control channel allocated in each slot.

(Hardware Configuration)

Note that the block diagrams that have been used to describe the above embodiments illustrate blocks in functional units. These functional blocks (configuration units) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (using wire, radio, or the like, for example) and using these plural apparatuses. The functional blocks may be implemented by combining software with the above-described single apparatus or the above-described plurality of apparatuses.

Here, the function includes, but is not limited to, deciding, determining, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like. For example, a functional block (configuration unit) that causes transmission to function may be referred to as a transmitting unit, a transmitter, and the like. In any case, as described above, the implementation method is not particularly limited.

Figure 15:
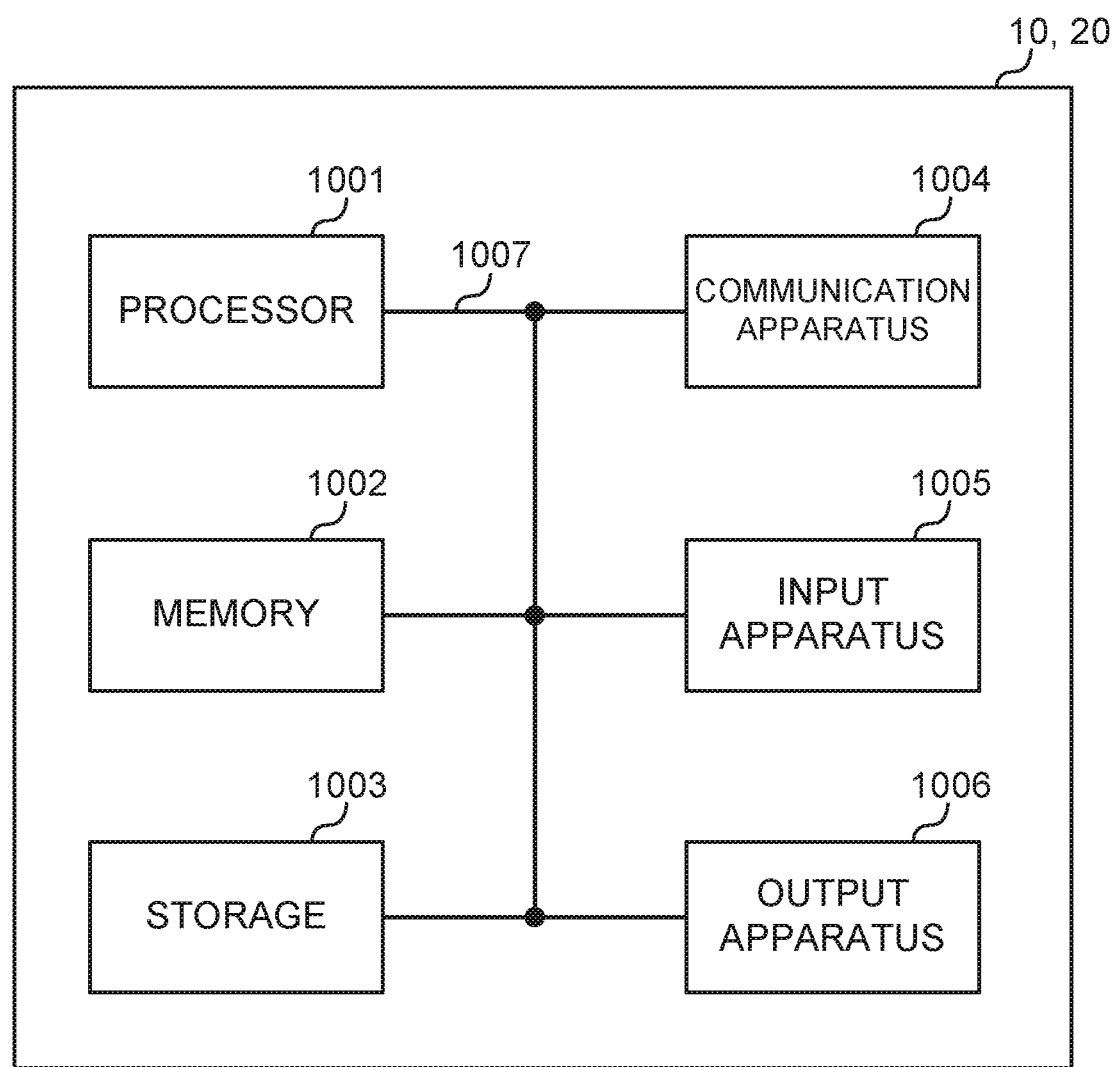
FIG. 15 is a diagram illustrating an example of a hardware configuration of a base station and a user terminal according to one embodiment.

For example, the base station, the user terminal, and the like according to one embodiment of the present disclosure may function as a computer that executes the processing of the radio communication method of the present disclosure. FIG. 15 is a diagram illustrating an example of a hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit can be replaced with each other. The hardware configuration of the base station 10 and the user terminal 20 may be configured to include one or a plurality of apparatuses illustrated in the drawings, or may be configured without including some apparatuses.

For example, although only one processor 1001 is illustrated, a plurality of processors may be provided. Further, the processing may be executed by one processor, or the processing may be executed in sequence or using other different methods by two or more processors. Note that the processor 1001 may be implemented with one or more chips.

Each function of the base station 10 and the user terminal 20 is implemented by, for example, controlling communication via the communication apparatus 1004 by causing predetermined software (program) to be read on hardware such as the processor 1001 and the memory 1002 and thereby causing the processor 1001 to perform operation, or by controlling at least one of reading and writing of data in the memory 1002 and the storage 1003.

The processor 1001 may control the whole computer by, for example, running an operating system. The processor 1001 may be configured with a central processing unit (CPU), which includes interfaces with peripheral equipment, control apparatus, computing apparatus, a register and the like. For example, at least a part of the above-described control section 110(210), transmitting/receiving section 120 (220), and the like may be implemented by the processor 1001.

Furthermore, the processor 1001 reads programs (program codes), software modules, data, and so on from at least one of the storage 1003 or the communication apparatus 1004 into the memory 1002, and executes various processing according to these. As the program, a program to cause a computer to execute at least a part of the operation described in the above-described embodiment is used. For example, the control section 110(210) may be implemented by a control program that is stored in the memory 1002 and operates in the processor 1001, and another functional block may be implemented similarly.

The memory 1002 is a computer-readable recording medium, and may be implemented by, for example, at least one of a read only memory (ROM), an erasable programmable ROM (EPROM), an electrically EPROM (EEPROM), a random access memory (RAM), and/or other appropriate storage media. The memory 1002 may be referred to as a register, a cache, a main memory (primary storage apparatus), and the like. The memory 1002 can store a program (program code), a software module, and the like, which are executable for implementing the radio communication method according to one embodiment of the present disclosure.

The storage 1003 is a computer-readable recording medium, and may be constituted by, for example, at least one of a flexible disk, a floppy (registered trademark) disk, a magneto-optical disk (for example, a compact disc ROM (CD-ROM) and the like), a digital versatile disc, a Blu-ray (registered trademark) disk), a removable disk, a hard disk drive, a smart card, a flash memory device (for example, a card, a stick, a key drive), a magnetic stripe, a database, a server, and other appropriate storage media. The storage 1003 may be referred to as an auxiliary storage apparatus.

The communication apparatus 1004 is hardware (transmission/reception device) for performing inter-computer communication through at least one of a wired network or a radio network, and may be referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmission/reception antenna 130 (230), and the like described above may be implemented by the communication apparatus 1004. The transmitting/receiving section 120 (220) may be implemented by physically or logically separating a transmitting section 120a (220a) and a receiving section 120b (220b) from each other.

The input apparatus 1005 is an input device for receiving input from the outside (for example, a keyboard, a mouse, a microphone, a switch, a button, a sensor, and so on). The output apparatus 1006 is an output device that performs output to the outside (for example, a display, a speaker, a light emitting diode (LED) lamp, and the like). Note that the input apparatus 1005 and the output apparatus 1006 may be provided in an integrated structure (for example, a touch panel).

Further, these apparatuses such as the processor 1001 and the memory 1002 are connected to each other by the bus 1007 to communicate information. The bus 1007 may be formed with a single bus, or may be formed with different buses for respective connections between the apparatuses.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented with at least one of these pieces of hardware.

(Variations)

Note that terms described in the present disclosure and terms necessary for understanding the present disclosure may be replaced with terms that have the same or similar meanings. For example, a channel, a symbol, and a signal (signal or signaling) may be replaced interchangeably. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may include one or a plurality of durations (frames) in the time domain. Each of the one or plurality of durations (frames) included in the radio frame may be referred to as a subframe. Further, the subframe may include one or more slots in the time domain. A subframe may be a fixed time length (for example, 1 ms) that is not dependent on numerology.

Here, the numerology may be a communication parameter used for at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, specific windowing processing performed by a transceiver in the time domain, and the like.

The slot may include one or a plurality of symbols (for example, orthogonal frequency division multiplexing (OFDM) symbol and single carrier frequency division multiple access (SC-FDMA) symbol) in the time domain. Further, the slot may be a time unit based on the numerology.

A slot may include a plurality of mini slots. Each mini slot may include one or a plurality of symbols in the time domain. Further, the mini slot may be referred to as a sub-slot. Each mini slot may include fewer symbols than a slot. A PDSCH (or PUSCH) transmitted in a time unit larger than a mini slot may be referred to as PDSCH (PUSCH) mapping type A. A PDSCH (or PUSCH) transmitted using a mini slot may be referred to as a PDSCH (PUSCH) mapping type B.

A radio frame, a subframe, a slot, a mini slot, and a symbol all represent the time unit in signal communication. The radio frame, the subframe, the slot, the mini slot, and the symbol may be called by other applicable names, respectively. Note that time units such as a frame, a subframe, a slot, a mini slot, and a symbol in the present disclosure may be replaced with each other.

For example, one subframe may be referred to as a TTI, a plurality of consecutive subframes may be referred to as a TTI, or one slot or one mini slot may be referred to as a TTI. That is, at least one of a subframe and a TTI may be a subframe (1 ms) in the existing LTE, may be a shorter period than 1 ms (for example, one to thirteen symbols), or may be a longer period of time than 1 ms. Note that a unit to represent a TTI may be referred to as a slot, a mini slot, or the like, instead of a subframe.

Here, for example, the TTI refers to a minimum time unit of scheduling in the radio communication. For example, in the LTE system, a base station performs scheduling to allocate radio resources (a frequency bandwidth and transmission power that can be used in each user terminal and the like) to each user terminal in TTI units. Note that the definition of the TTI is not limited thereto.

The TTI may be the transmission time unit of channel-encoded data packets (transport blocks), code blocks, or codewords, or may be the unit of processing in scheduling, link adaptation, or the like. Note that when TTI is given, a time interval (for example, the number of symbols) in which the transport blocks, the code blocks, the codewords, and the like are actually mapped may be shorter than TTI.

Note that in a case where one slot or one mini slot is referred to as a TTI, one or more TTIs (that is, one or more slots or one or more mini slots) may be the minimum time unit of scheduling. Further, the number of slots (the number of mini slots) constituting the minimum time unit of the scheduling may be controlled.

A TTI having a time length of 1 ms may be referred to as a usual TTI (TTI in 3GPP Rel. 8 to 12), a normal TTI, a long TTI, a usual subframe, a normal subframe, a long subframe, a slot, and the like. A TTI shorter than the usual TTI may be referred to as a shortened TTI, a short TTI, a partial TTI (or fractional TTI), a shortened subframe, a short subframe, a mini slot, a sub-slot, a slot, or the like.

Note that the long TTI (for example, the usual TTI, subframe, or the like) may be replaced with a TTI having a time length exceeding 1 ms, and the short TTI (for example, the shortened TTI or the like) may be replaced with a TTI having a TTI length less than the TTI length of the long TTI and not less than 1 ms.

A resource block (RB) is a resource allocation unit in the time domain and the frequency domain, and may include one or a plurality of consecutive subcarriers in the frequency domain. The number of subcarriers included in the RB may be the same regardless of the numerology, and may be twelve, for example. The number of subcarriers included in the RB may be determined based on numerology.

Further, the RB may include one or a plurality of symbols in the time domain, and may be one slot, one mini slot, one subframe, or one TTI in length. One TTI, one subframe, and the like each may include one or a plurality of resource blocks.

Note that one or a plurality of RBs may be referred to as a physical resource block (PRB), a sub-carrier group (SCG), a resource element group (REG), a PRB pair, an RB pair, and the like.

Further, the resource block may include one or a plurality of resource elements (REs). For example, one RE may be a radio resource area of one subcarrier and one symbol.

A bandwidth part (BWP) (which may be referred to as a partial bandwidth or the like) may represent a subset of consecutive common resource blocks (RBs) for certain numerology in a certain carrier. Here, the common RB may be specified by the index of the RB based on a common reference point of the carrier. The PRB may be defined in a certain BWP and be numbered within the BWP.

The BWP may include a BWP for UL (UL BWP) and a BWP for DL (DL BWP). For the UE, one or a plurality of BWPs may be configured within one carrier.

At least one of the configured BWPs may be active, and the UE may not assume to transmit or receive a predetermined signal/channel outside the active BWP. Note that "cell", "carrier", and the like in the present disclosure may be replaced with "BWP".

Note that the structures of radio frames, subframes, slots, mini slots, symbols, and the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

Further, the information, parameters, and the like described in the present disclosure may be represented by using absolute values, may be represented by using relative values with respect to predetermined values, or may be represented by using other corresponding information. For example, a radio resource may be specified by a predetermined index.

The names used for parameters and the like in the present disclosure are in no respect limiting. Furthermore, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represented by using a variety of different technologies. For example, data, instructions, commands, information, signals, bits, symbols, and chips, all of which may be referenced throughout the herein-contained description, may be represented by voltages, currents, electromagnetic waves, magnetic fields or particles, optical fields or photons, or any combination of these.

Further, information, signals, and the like can be output in at least one of a direction from higher layers to lower layers and a direction from lower layers to higher layers. Information, signals, and so on may be input and output via a plurality of network nodes.

The information, signals, and the like that are input and/or output may be stored in a specific location (for example, in a memory), or may be managed with a management table. The information, signal, and the like to be input and output can be overwritten, updated, or appended. The output information, signal, and the like may be deleted. The information, signals, and the like that are input may be transmitted to other apparatuses.

Notification of information may be performed not only by using the aspects/embodiments described in the present disclosure but also using another method. For example, notification of information in the present disclosure may be performed by using physical layer signaling (for example, downlink control information (DCI), uplink control information (UCI)), higher layer signaling (for example, radio resource control (RRC) signaling, broadcast information (master information block (MIB), system information block (SIB), or the like), medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of MAC signaling may be performed using, for example, a MAC control element (MAC CE).

Further, notification of predetermined information (for example, notification of "being X") is not limited to explicit notification but may be performed implicitly (for example, by not performing notification of the predetermined information or by performing notification of another piece of information).

Decisions may be made in values represented by one bit (0 or 1), may be made in Boolean values that represent true or false, or may be made by comparing numerical values (for example, comparison against a predetermined value).

Software, whether referred to as "software", "firmware", "middleware", "microcode", or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Further, the software, instruction, information, and the like may be transmitted and received via a transmission medium. For example, when software is transmitted from a website, a server, or another remote source by using at least one of a wired technology (coaxial cable, optical fiber cable, twisted pair, digital subscriber line (DSL), or the like) and a wireless technology (infrared rays, microwaves, and the like), at least one of the wired technology and the wireless technology is included within the definition of a transmission medium.

The terms "system" and "network" used in the present disclosure can be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. A base station may be referred to as a term such as a macro cell, a small cell, a femto cell, a pico cell, and the like.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small remote radio head (RRH) for indoors). The term "cell" or "sector" refers to a part or the whole of a coverage area of at least one of a base station and a base station subsystem that perform a communication service in this coverage.

In the present disclosure, the terms such as mobile station (MS)", "user terminal", "user equipment (UE)", and "terminal" can be used interchangeably.

A mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, or a client, or by some other appropriate terms.

At least one of the base station or the mobile station may be referred to as a transmission apparatus, a reception apparatus, a radio communication apparatus, or the like. Note that at least one of the base station and the mobile station may be a device mounted on a moving object, a moving object itself, and the like. The moving object may be a transportation (for example, a car, an airplane and the like), an unmanned moving object (for example, a drone, an autonomous car, and the like), or a (manned or unmanned) robot. Note that at least one of the base station and the mobile station also includes an apparatus that does not necessarily move during a communication operation. For example, at least one of the base station and the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In the case, the user terminal 20 may have the function of the above-described base station 10. Further, terms such as "uplink" and "downlink" may be replaced with terms corresponding to communication between terminals (for example, "side"). For example, the uplink channel, the downlink channel, and the like may be replaced with a side channel.

Similarly, the user terminal in the present disclosure may be replaced with the base station. In this case, the base station 10 may be configured to have the above-described functions of the user terminal 20

In the present disclosure, an operation performed by a base station may be performed by an upper node thereof in some cases. In a network including one or a plurality of network nodes including the base station, it is clear that various operations performed to communicate with terminals may be performed by the base station, one or more network nodes other than the base station (for example, mobility management entity (MME), serving-gateway (S-GW), and the like are conceivable, but there is no limitation), or a combination thereof.

Each aspect/embodiment described in the present disclosure may be used alone, used in combination, or switched in association with execution. Further, the processing procedures, sequences, flowcharts, and the like of each aspect/embodiment that have been described in the present disclosure may be re-ordered as long as inconsistencies do not arise. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. Further, a plurality of systems may be combined and applied (for example, a combination of LTE or LTE-A and 5G, and the like).

The phrase "based on" as used in the present disclosure does not mean "based only on", unless otherwise specified. In other words, the phrase "based on" means both "based only on" and "based at least on".

Any reference to an element using designations such as "first" and "second" used in the present disclosure does not generally limit the amount or order of these elements. These designations can be used in the present disclosure, as a convenient way of distinguishing between two or more elements. In this way, reference to the first and second elements does not imply that only two elements may be employed, or that the first element must precede the second element in some way.

The term "determining" as used in the present disclosure may include a wide variety of operations. For example, "determining" may be regarded as "determining" of judging, calculating, computing, processing, deriving, investigating, looking up, search, inquiry (for example, looking up in a table, database, or another data structure), ascertaining, or the like.

Further, "determining" may be regarded as "determining" of receiving (for example, receiving information), transmitting (for example, transmitting information), inputting, outputting, accessing (for example, accessing data in a memory), and the like.

Further, "determining" may be regarded as "determining" of resolving, selecting, choosing, establishing, comparing, and the like. In other words, "determining" may be regarded as "determining" of a certain operation.

Furthermore, "determining" may be replaced with "assuming", "expecting", "considering", and the like.

As used in the present disclosure, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced with "access".

As used in the present disclosure, when two elements are connected, these elements may be considered to be "connected" or "coupled" to each other by using one or more electrical wires, cables, printed electrical connections, and the like, and, as some non-limiting and non-inclusive examples, by using electromagnetic energy and the like having wavelengths in the radio frequency, microwave, and optical (both visible and invisible) domains.

In the present disclosure, the phrase "A and B are different" may mean "A and B are different from each other". Note that the description may mean that "A and B are different from C". Terms such as "leave", "coupled", or the like may also be interpreted in the same manner as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, when articles, such as "a", "an", and "the" are added in English translation, the present disclosure may include the plural forms of nouns that follow these articles.

Now, although invention according to the present disclosure has been described above in detail, it is obvious to those skilled in the art that the invention according to the present disclosure is by no means limited to the embodiments described in the present disclosure. The invention according to the present disclosure can be embodied with various corrections and in various modified aspects, without departing from the spirit and scope of the invention defined based on the description of claims. Thus, the description of the present disclosure is for the purpose of explaining examples and does not bring any limiting meaning to the invention according to the present disclosure.

The invention claimed is:

1. A terminal comprising:
a receiver configured to receive at least one shared channel scheduled by using a plurality of downlink control channels allocated in a plurality of slots, respectively; and
a processor configured to determine allocation of the at least one shared channel in a time domain based on:
allocation information regarding allocation of the at least one shared channel in the time domain, notification of the allocation information given by the plurality of downlink control channels, and
a reference point configured for the plurality of slots,
wherein out of the at least one shared channel, a first shared channel in the time domain is allocated after a last downlink control channel in the time domain out of the plurality of downlink control channels.

2. The terminal according to claim 1, wherein the plurality of downlink control channels are allocated in the plurality of slots for downlink control channel repetition transmission.

3. The terminal according to claim 1, wherein the processor applies a different reference point to each of a plurality of the allocation information corresponding to the plurality of downlink control channels.

4. The terminal according to claim 1, wherein the processor applies a same reference point to each of a plurality of the allocation information corresponding to the plurality of downlink control channels.

5. A radio communication method comprising:
receiving at least one shared channel scheduled by using a plurality of downlink control channels allocated in a plurality of slots, respectively; and
determining allocation of the at least one shared channel in a time domain based on:
allocation information regarding allocation of the at least one shared channel in the time domain, notification of the allocation information given by the plurality of downlink control channels, and
a reference point configured for the plurality of slots,
wherein out of the at least one shared channel, a first shared channel in the time domain is allocated after a last downlink control channel in the time domain out of the plurality of downlink control channels.

* * * * *